US008904549B2

(12) United States Patent
Mogaki

(10) Patent No.: US 8,904,549 B2
(45) Date of Patent: Dec. 2, 2014

(54) SERVER SYSTEM, CONTROL METHOD, AND STORAGE MEDIUM FOR SECURELY EXECUTING ACCESS TO DATA OF A TENANT

(75) Inventor: Shunsuke Mogaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 13/526,878

(22) Filed: Jun. 19, 2012

(65) Prior Publication Data

US 2013/0007891 A1 Jan. 3, 2013

(30) Foreign Application Priority Data

Jun. 29, 2011 (JP) ................................ 2011-144654

(51) Int. Cl.
*G06F 21/24* (2006.01)
*G06F 21/62* (2013.01)
*H04L 29/06* (2006.01)

(52) U.S. Cl.
CPC ............ *G06F 21/62* (2013.01); *G06F 21/6218* (2013.01); *H04L 63/0807* (2013.01); *H04L 63/104* (2013.01)
USPC .......... 726/27; 726/1; 726/2; 726/26; 726/28; 726/29; 707/703; 707/E17.005

(58) Field of Classification Search
CPC . G06F 21/62; G06F 21/6218; H04L 63/0807; H04L 63/104; H04L 63/105
USPC ............... 726/1, 2, 26–29; 707/703, E17.005
See application file for complete search history.

(56) References Cited

U.S. PATENT DOCUMENTS

| | | | | |
|---|---|---|---|---|
| 5,787,428 A | * | 7/1998 | Hart | 1/1 |
| 6,134,549 A | * | 10/2000 | Regnier et al. | 1/1 |
| 6,587,854 B1 | * | 7/2003 | Guthrie et al. | 1/1 |
| 7,949,684 B2 | * | 5/2011 | Brooks et al. | 707/802 |
| 8,010,991 B2 | * | 8/2011 | Sarukkai et al. | 726/1 |
| 8,291,490 B1 | * | 10/2012 | Ahmed et al. | 726/17 |
| 8,595,799 B2 | * | 11/2013 | Afek et al. | 726/4 |
| 8,763,145 B2 | * | 6/2014 | Mihara | 726/26 |

(Continued)

FOREIGN PATENT DOCUMENTS

| | | | | |
|---|---|---|---|---|
| JP | 2010-26653 A | 2/2010 | | |
| WO | WO02/093396 | * 11/2002 | | G06F 15/16 |

OTHER PUBLICATIONS

Guo et al., "A Framework for Native Multi-Tenancy Application Developement and Management", 2007, The 9th IEEE International COnference on E-Commerce.*

*Primary Examiner* — Kambiz Zand
*Assistant Examiner* — Tongoc Tran
(74) *Attorney, Agent, or Firm* — Canon USA, Inc., IP Division

(57) ABSTRACT

In a multitenant service, security of the entire service is guaranteed by logically separating data for each tenant, and performing control to prevent access to data of another tenant. In an operation of the multitenant service, there are some special cases in which an access to data of another tenant becomes necessary. Further, processing executable across tenants needs to be subjected to restrictions on an executor of the processing and a processing target in addition to restrictions on a processing content. In data access control of the multitenant service, a control operation to determine whether processing is executable across tenants for each API and a control operation to determine whether processing is executable across tenants according to tenant categories of the executor and the processing target are performed.

10 Claims, 21 Drawing Sheets

(56) References Cited

U.S. PATENT DOCUMENTS

| | | | |
|---|---|---|---|
| 2003/0023560 A1* | 1/2003 | Soma | 705/51 |
| 2005/0239454 A1* | 10/2005 | Kawashima et al. | 455/426.1 |
| 2008/0184556 A1* | 8/2008 | Cho et al. | 29/831 |
| 2010/0138830 A1* | 6/2010 | Astete et al. | 718/1 |
| 2010/0211548 A1* | 8/2010 | Ott et al. | 707/655 |
| 2010/0325684 A1* | 12/2010 | Grebenik et al. | 726/1 |
| 2011/0106771 A1* | 5/2011 | McDonald et al. | 707/663 |
| 2011/0106802 A1* | 5/2011 | Pinkney et al. | 707/737 |
| 2011/0213789 A1* | 9/2011 | Doshi et al. | 707/754 |

* cited by examiner

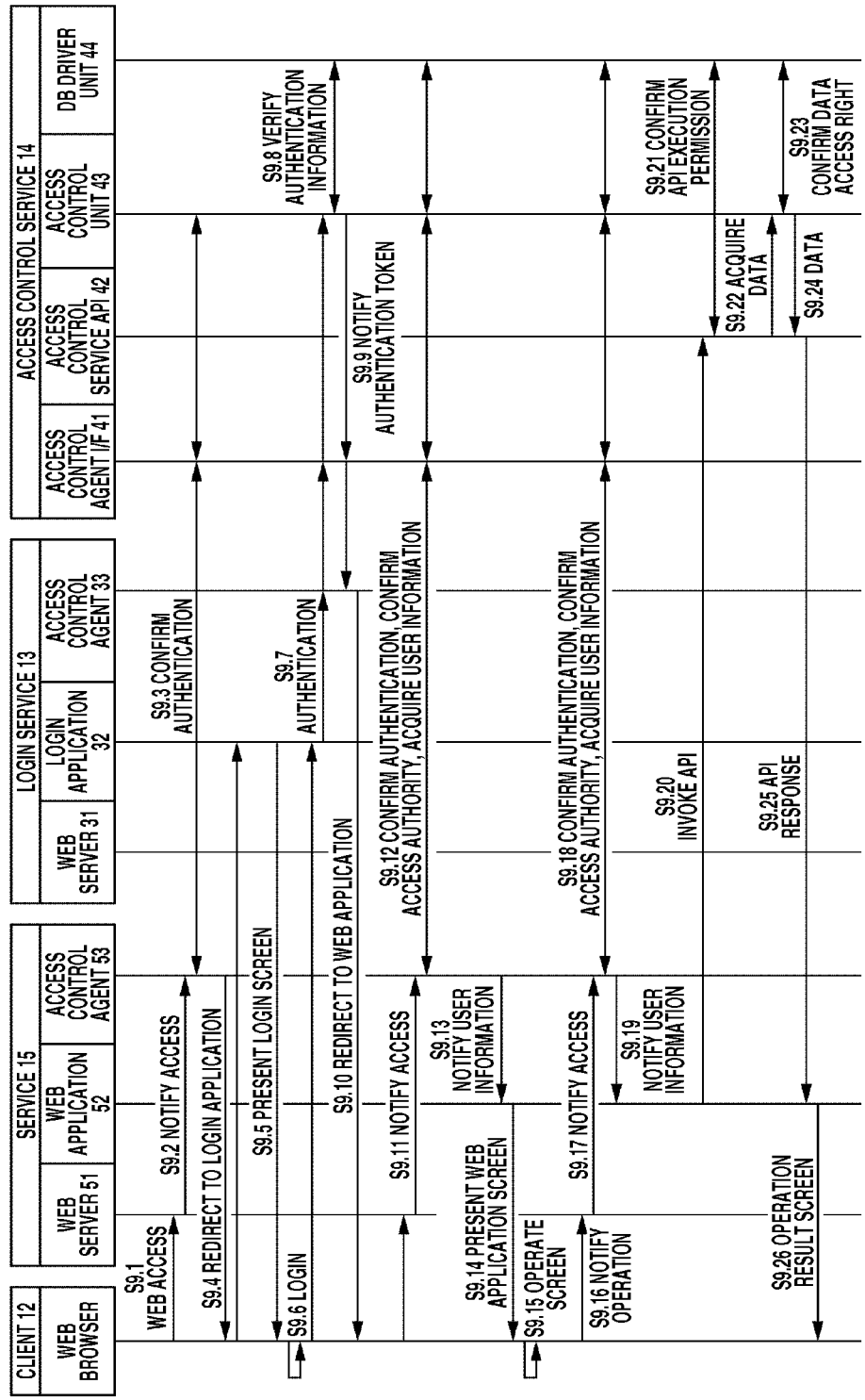

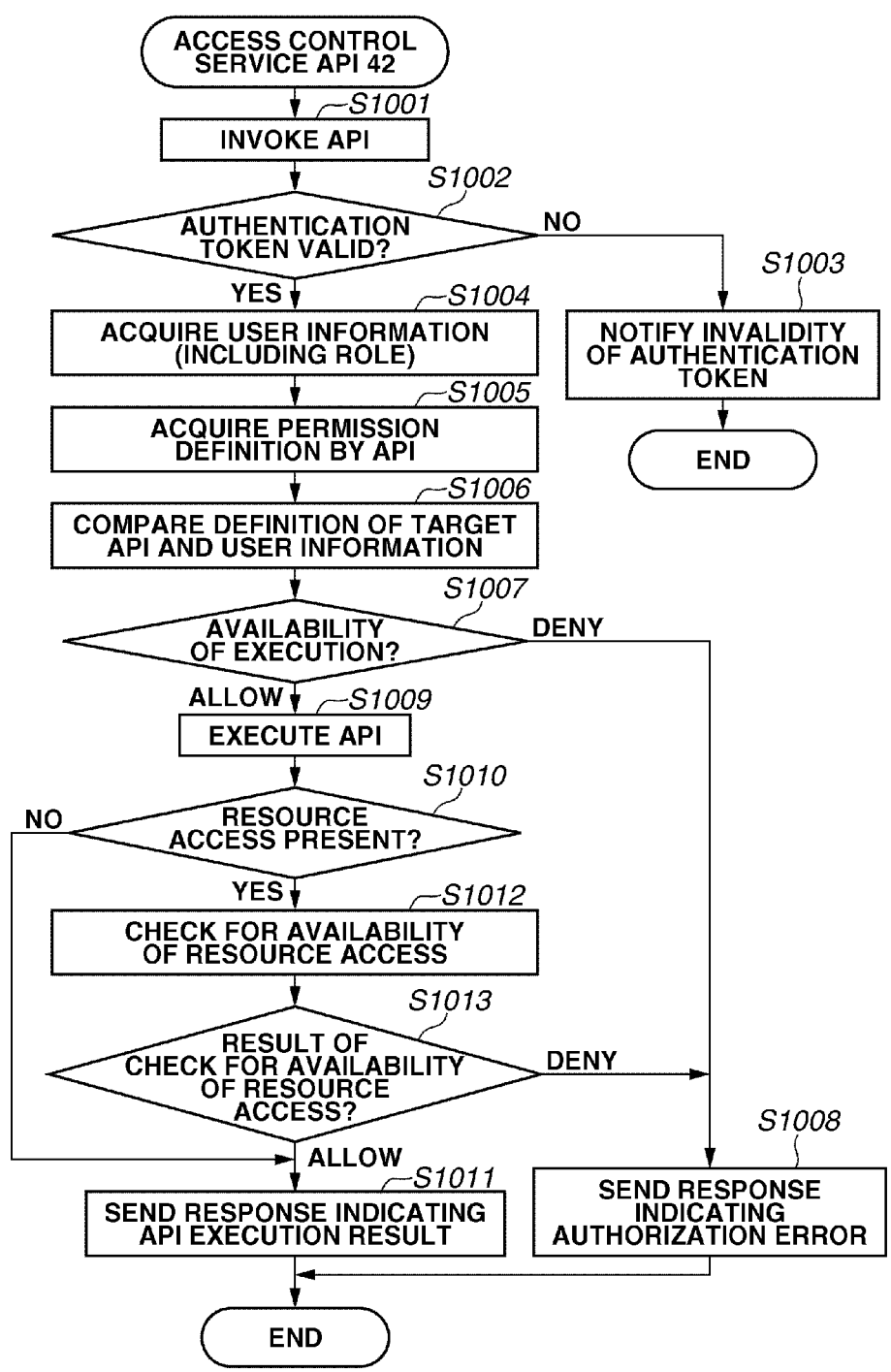

FIG.11

USER TABLE (111)

| USER ID | PASSWORD | USER TYPE ID | TENANT ID |
|---|---|---|---|
| SuperUser | ************ | * | TA00000000 |
| ProviderAdmin01 | ********** | TY00000001 | TA00000001 |
| ProviderUser01 | ********** | TY00000001 | TA00000001 |
| SalesAdmin01 | ********** | TY00000002 | TA00000002 |
| SalesUser01 | ********** | TY00000002 | TA00000002 |
| CustomerAdmin01 | ******** | TY00000003 | TA00000003 |
| CustomerUser01 | ******** | TY00000003 | TA00000003 |
| ... | ... | ... | ... |

USER ROLE TABLE (112)

| USER ID | ROLE ID |
|---|---|
| SuperUser | SuperUser |
| ProviderAdmin01 | ProviderAdmin |
| ProviderAdmin01 | Provider |
| ProviderAdmin01 | TA00000001 |
| ProviderAdmin01 | Provisioning |
| Provider01 | Provider |
| Provider01 | TA00000001 |
| SalesAdmin01 | SalesAdmin |
| SalesAdmin01 | Sales |
| SalesAdmin01 | TA00000002 |
| SalesAdmin01 | Provisioning |
| SalesUser01 | Sales |
| SalesUser01 | TA00000002 |
| CustomerAdmin01 | CustomerAdmin |
| CustomerAdmin01 | Customer |
| CustomerAdmin01 | TA00000003 |
| CustomerAdmin01 | Provisioning |
| CustomerUser01 | Customer |
| CustomerUser01 | TA00000003 |
| ... | ... |

FIG.12

121 ROLE CATEGORY TABLE

| ID | DESCRIPTION |
|---|---|
| ManagementRole | MANAGEMENT ROLE |
| ProductRole | PRODUCT ROLE |
| TenantRole | TENANT ROLE |
| ... | ... |

122 ROLE TABLE

| ROLE ID | ROLE CATEGORY ID |
|---|---|
| SuperUser | ManagementRole |
| ProviderAdmin | ManagementRole |
| Provider | ManagementRole |
| SalesAdmin | ManagementRole |
| Sales | ManagementRole |
| CustomerAdmin | ManagementRole |
| Customer | ManagementRole |
| Provisioning | ProductRole |
| TA00000001 | TenantRole |
| TA00000002 | TenantRole |
| ... | ... |

123 RESOURCE CATEGORY TABLE

| ID | DESCRIPTION |
|---|---|
| UrlResource | URL RESOURCE |
| DataResource | DATA RESOURCE |
| ... | ... |

124 RESOURCE ROLE TABLE

| RESOURCE ID | ROLE ID |
|---|---|
| R00000001 | Provider |
| R00000001 | Sales |
| R00000001 | Customer |
| R00000002 | Provider |
| R00000002 | Sales |
| R00000003 | TA00000001 |
| R00000004 | TA00000002 |
| R00000005 | TA00000003 |
| ... | ... |

125 RESOURCE TABLE

| RESOURCE ID | RESOURCE CATEGORY ID | PROTECTED ITEM | AUTHORITY |
|---|---|---|---|
| R00000001 | UrlResource | http://xxx.com/menu/* | Read |
| R00000002 | UrlResource | http://xxx.com/tenant/* | Read, Update |
| R00000003 | DataResource | TY00000001 | Create, Read, Update, Delete |
| R00000004 | DataResource | TY00000002 | Create, Read, Update, Delete |
| R00000005 | DataResource | TY00000003 | Create, Read, Update, Delete |
| ... | ... | ... | ... |

FIG.13

131 TENANT CATEGORY TABLE

| ID | DESCRIPTION |
|---|---|
| ProviderTenant | PROVIDER TENANT |
| SalesTenant | SALES TENANT |
| CustomerTenant | CUSTOMER TENANT |
| Self | SELF |
| ... | ... |

132 TENANT TABLE

| TENANT ID | USER TYPE ID | TENANT CATEGORY ID |
|---|---|---|
| TA00000001 | TY00000001 | ProviderTenant |
| TA00000002 | TY00000002 | SalesTenant |
| TA00000003 | TY00000003 | CustomerTenant |
| ... | ... | ... |

133 API AUTHORITY TABLE

| FUNCTION ID | ROLE ID | OPERATING TENANT CATEGORY ID | OPERATED TENANT CATEGORY ID | AVAILABILITY OF ELEVATION |
|---|---|---|---|---|
| CreateTenant | Provider | ProviderTenant | SalesTenant | Allow |
| CreateTenant | Sales | SalesTenant | CustomerTenant | Allow |
| GetLicenseInfo | ProviderAdmin | ProviderTenant | ProviderTenant | Deny |
| GetLicenseInfo | Provider | ProviderTenant | Self | Deny |
| GetLicenseInfo | SalesAdmin | SalesTenant | SalesTenant | Deny |
| GetLicenseInfo | Sales | SalesTenant | Self | Deny |
| CountLicense | Provider | ProviderTenant | SalesTenant | Allow |
| CountLicense | Sales | SalesTenant | CustomerTenant | Allow |
| ... | ... | ... | ... | ... |

134 LICENSE TABLE

| LICENSE ID | SERVICE NAME |
|---|---|
| TL00000001 | Service01 |
| TL00000002 | Service02 |
| TL00000003 | SV00000003 |
| ... | ... |

135 NUMBER-OF-CONTRACT-LICENSES TABLE

| USER TYPE ID | CONTRACTED TENANT ID | LICENSE ID | NUMBER OF LICENSES |
|---|---|---|---|
| TY00000002 | TA00000003 | TL00000001 | 10 |
| TY00000002 | TA00000003 | TL00000002 | 20 |
| TY00000002 | TA00000004 | TL00000001 | 20 |
| ... | ... | ... | ... |

136 NUMBER-OF-CONTRACT-LICENSES TABLE

| USER TYPE ID | LICENSE ID | NUMBER OF LICENSES |
|---|---|---|
| TY00000003 | TL00000001 | 10 |
| TY00000003 | TL00000002 | 15 |
| TY00000004 | TL00000001 | 15 |
| ... | ... | ... |

FIG.17

SERVER SYSTEM, CONTROL METHOD, AND STORAGE MEDIUM FOR SECURELY EXECUTING ACCESS TO DATA OF A TENANT

BACKGROUND OF THE INVENTION

1. Field of the Invention

The present invention relates to an access control method for a resource of a tenant different from an executor in a multitenant service.

2. Description of the Related Art

Conventionally, a web application has mainly taken a form for preparing and providing a dedicated server for each enterprise or organization of service delivery destination. However, the form for preparing the dedicated server for each delivery destination degrades cost efficiency. Therefore, in recent years, a form called a "multitenant service" for providing one and the same web application loaded on a shared server to a plurality of enterprises or organizations has been receiving plenty of attention. Here, the "tenant" means a unit of enterprise or organization to which services are to be provided with the conventional dedicated server.

As compared with a method for using a dedicated server for each tenant, the multitenant service is superior in terms of costs but has issues in terms of security. In the conventional form, since data which a tenant possesses is managed by the dedicated server for each tenant, and is physically separated, and as a result, a risk of data leakage is low. However, in the multitenant service, since data of a plurality of tenants is managed by a shared server, the data is not physically separated, and as a result, a risk of data leakage becomes high. Therefore, in the multitenant service, a mechanism for logically separating the data is essential in order to prevent data leakage among tenants.

For example, Japanese Patent Application Laid-Open No. 2010-26653 discusses a method for using a tenant ID as a key for logically separating data. The multitenant service is realized by a method for associating the tenant ID with a user ID which is an attribute for identify the user, and similarly assigning the tenant ID also to the data which the tenant possesses. More specifically, this is an access control method for identifying the user ID as well as the tenant ID by a user authentication, and authorizing access to only the data to which the identical tenant ID has been assigned, during data access.

In the multitenant service, security of the entire service is guaranteed by logically separating the data for each tenant, and performing control so that data of other tenants cannot be accessed.

However, in an operation of the multitenant service, there are some special cases in which accesses to the data of other tenants become necessary.

SUMMARY OF THE INVENTION

The present invention is directed to a method for securely executing an access to data of a tenant different from an executor in a multitenant service.

According to an aspect of the present invention, a server system that provides a multitenant service includes a first determination unit configured to determine whether a first tenant to which an executor that has instructed an execution of a function belongs is identical to a second tenant that is a target of processing by the function, an allowance unit configured to, if it is determined by the first determination unit that the first tenant and the second tenant are identical, allow the executor to execute the function, a second determination unit configured to, if it is determined by the first determination unit that the first tenant and the second tenant are not identical, determine whether the function is processable even if the first tenant and the second tenant are not identical, and a third determination unit configured to, if it is determined by the second determination unit that the function is processable even if the first tenant and the second tenant are not identical, determine whether a relationship between the first tenant and the second tenant is a relationship that allows an execution of the function. If it is determined by the third determination unit that a relationship between the first tenant and the second tenant is a relationship that allows an execution of the function, the allowance unit allows the executor to execute the function with respect to the second tenant.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates access sequences of general web application.

FIG. 10A is a flowchart of access control.

FIG. 11 illustrates an example of data of user information.

FIG. 12 illustrates an example of data of resource information.

FIG. 13 illustrates an example of data of API authority information.

FIG. 17 is a flowchart of tenant creation and API execution.

DESCRIPTION OF THE EMBODIMENTS

Various exemplary embodiments, features, and aspects of the invention will be described in detail below with reference to the drawings.

Figure 1:
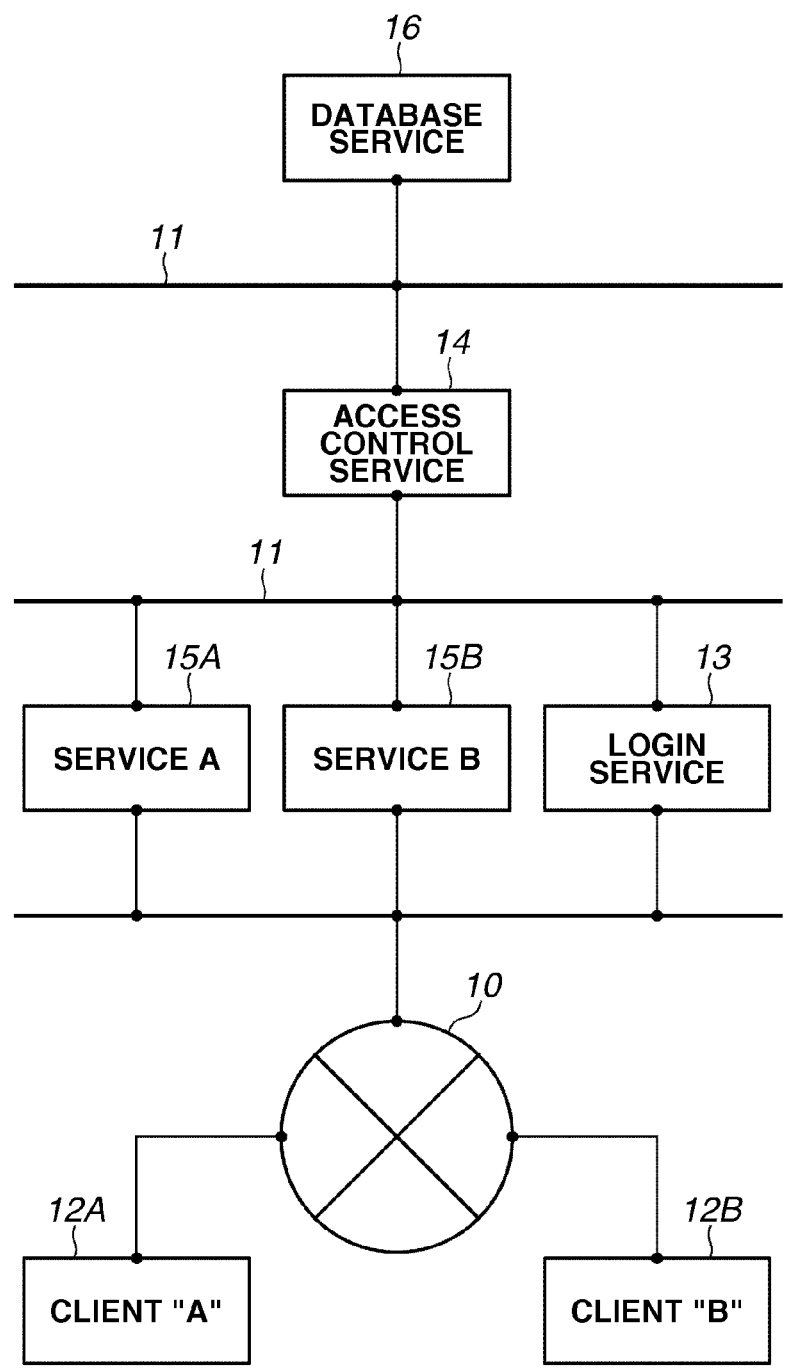
FIG. 1 is a configuration view of a server system according to an exemplary embodiment of the present invention.

FIG. 1 is a block diagram illustrating a configuration of a server system according to a first exemplary embodiment of the present invention.

A World Wide Web (WWW) system is built via a wide area network 10 (a WAN 10) in the present exemplary embodiment. A local area network 11 (a LAN 11) connects respective constituent components to one another.

A plurality of clients 12A and 12B issues web requests to respective services via the WAN 10, and more specifically, each of the clients 12A and 12B is a computer provided with a web browser for using the WWW system. The client 12A and the client 12B are cut off from communications other than requests to the WAN 10, by a firewall apparatus (not illustrated).

A login service 13 presents a login screen for authenticating a user, according to the web request from the client 12, via the WAN 10 and the LAN 11, and accepts a login request from the user.

An access control service 14 accepts requests for access allowances from the login service 13 and, one or a plurality of services 15 via the LAN 11.

One or a plurality of service 15A and service 15B provides various types of services, according to the web requests from the client 12, via the WAN 10 and the LAN 11.

A database service 16 accepts data access requests from the access control service 14 via the LAN 11. The database service 16 constitutes a general database management system (DBMS), accepts a data access query from the access control service 14, and sends a response indicating appropriate data.

Figure 2:
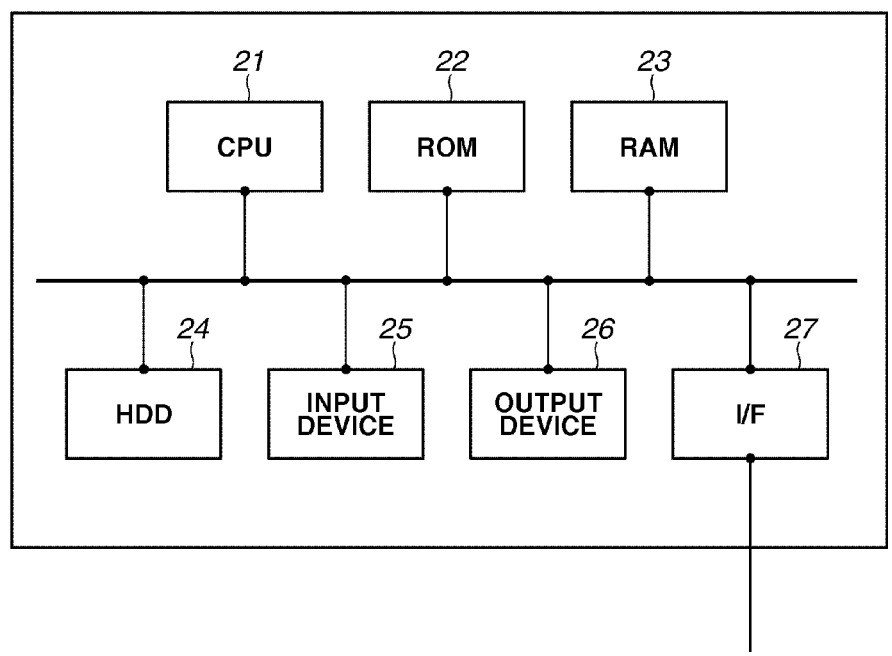
FIG. 2 is a hardware configuration view of respective devices.

FIG. 2 is a block diagram illustrating a hardware configuration of the client 12, the login service 13, the access control service 14, the service 15, or the database service 16 in FIG. 1. A central processing (CPU) 21 directly or indirectly controls respective devices (e.g., a read-only memory (ROM), a random-access memory (RAM) described below) connected via an internal bus, and executes programs for realizing the present exemplary embodiment. A ROM 22 stores basic output/input system (BIOS) therein. A RAM (direct storage device) 23 is used as a work area for the CPU 21, or used as a temporary storage for loading software modules for realizing the present exemplary embodiment. A hard disk drive (HDD) 24, or indirect storage device such as solid-state drive (SSD), stores therein an operating system (OS) serving as a basic software or a software module. An input device 25 is a keyboard or a pointing device (not illustrated). An output device 26 is connected to a display. An interface (I/F) 27 is used to connect to the WAN 10 or the LAN 11, and includes one or a plurality of interfaces.

In these pieces of hardware, after their startup the BIOS is executed by the CPU 21 and the OS is executably loaded from the HDD 24 into the RAM 23. The CPU 21 executably loads anytime, various types of software modules described below from the HDD 24 into the RAM 23 in accordance with an operation of the OS. The various types of software modules are executed and operated by the CPU 21 in cooperation with the above-described respective devices. Further, the I/F 27 is connected to the LAN 11, and is controlled by the CPU 21 in accordance with the operation of the OS, and implements transmission/reception of requests between the services stored in respective servers. Further, the I/F 27 is connected to the WAN 10 via the LAN 11, and is controlled by the CPU 21 in accordance with the operation of the OS, thereby implementing communications in the WWW system.

Further, the login service 13, the access control service 14, the service 15, or the database service 16 in FIG. 1 is constituted by one set or a plurality of sets of servers of the hardware configuration illustrated in FIG. 2. In the case of being constituted by a plurality of sets of servers, a load distribution configuration or a redundancy configuration can be adopted by a load balancer device (not illustrated) or software modules (not illustrated).

Then, concrete examples of issues which the present exemplary embodiment assumes will be described. For example, when service delivery is started, access to data of other tenants may occur in some cases. When a new enterprise or an organization starts use of a cloud service, a tenant for a customer becomes necessary on the cloud service, and accordingly, a user having tenant creation authority creates a new tenant. At this time, a user account which allows tenant management to be performed within the tenant may be created by the authority of a tenant creator. Further, a user which has sold a service to the customer may access to a portion of the data within a tenant of the customer. In order for the user to use fare-paying service in the cloud service, the user needs to conclude a contract with a seller of the service, and purchase a license of the service. At this time, the seller of the service may check, for the purpose of sales management or the like, how many licenses the tenant of the customer with which the seller has made a contract is currently using.

Even by the conventional multitenant implementing method, access to the data of other tenants can be implemented by temporarily granting to an executor an access right to a target tenant, or preparing a super user which has an access right to all tenants. However, with such a method, a user having the access right to the data of other tenants would be able to execute all processing across tenants, which raises problems in terms of security.

For example, in an example of the above-described tenant creation, a service provider is allowed to create a tenant and a user account within the tenant, but is not allowed to delete the user within the tenant after service delivery.

Similarly in an example of the above-described acquisition of a number of licenses, the seller of the service is allowed to acquire a total number of licenses being used in the tenant of the customer with which the seller has made a contract, but is not allowed to acquire personal information such as the name or address of the user, with whom the license is associated.

In this way, when access to the data of other tenants is allowed, it is necessary to impose restrictions on the processing which is executable across tenants. However, in order to impose restrictions on the processing by the conventional multitenant implementing method, delicate control of the access right will become necessary, and management of the access right will become complex, during the user creation or the processing execution, for example.

Furthermore, the processing which is executable across tenants also necessitates control by a user which executes the processing. For example, users which use the cloud service are assumed to be classified into a user which operates the cloud service (provider), a user which sells the service (seller), and a user which uses the service (customer). In this regard, the provider is a user which performs an operation of the service, which also includes a system administrator or a developer or the like. The provider makes an entrustment of service sales to the seller, and concludes a sales contract with the seller and creates a tenant of the seller. To this end, the provider may access to data of the sales tenant, for the sales tenant creation or the system management. The seller is a user which performs sales of services, concludes a use contract with a customer, and creates a tenant of the customer. Further, the seller performs sales of the fare-paying services to the customer, and performs an issuance of licenses to the user which has concluded the contract. To this end, the seller may access the data of the customer tenant for the creation of customer tenant or the sales management. In this regard, since the seller has concluded a contract with the customer, the seller is allowed to access the data of the customer tenant. However, the provider, which has concluded a contract with the seller, has not concluded a contract with the customer. Accordingly, the provider is not allowed to access to the data of the customer tenant. If an administrator would be able to access the data of the customer tenant, it will result in leakage of customer information.

In this way, the processing which can be executed across tenants needs to impose restrictions on an executor of the processing and a processing target, in addition to restrictions on processing contents.

Figure 3:
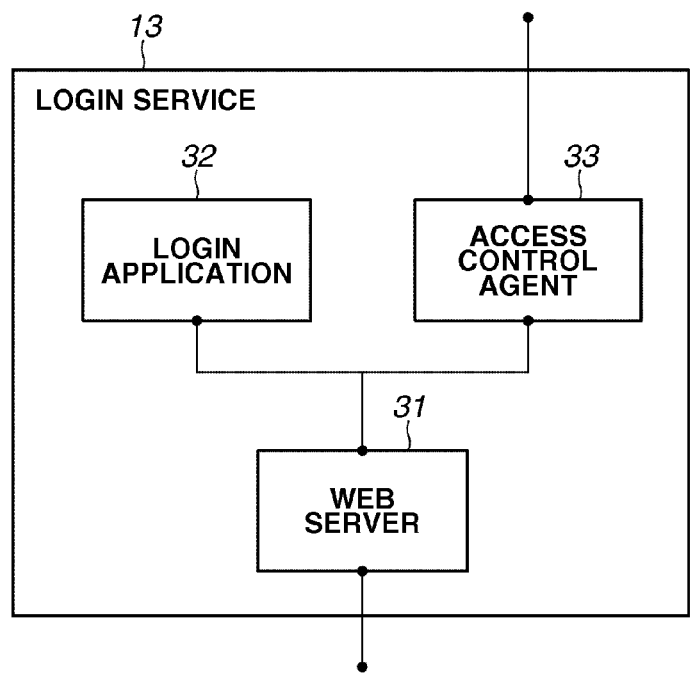
FIG. 3 is an explanatory view of software modules of a login service.

FIG. 3 is a configuration view of software modules which operate on a login service 13. Respective software modules are stored in the HDD 24 illustrated in FIG. 2, and are loaded into the RAM 23 and executed by the CPU 21, as described above.

A web server 31 is a web application server provided with a web interface which accepts a web request from the client 12.

A login application 32 is configured as an application on the web server 31, and generates a login screen, in response to a web request which the web server 31 has accepted.

An access control agent 33 is configured as a filtering application on the web server 31, and filters the web request to the login application 32. Then, the access control agent 33 executes authentication processing of the user by communicating with an access control agent I/F 41 configured in the access control service 14.

Thereafter, a series of authentication processing executed by cooperation of the above-described software modules is described as processing executed by the login service 13. The authentication processing of the user executed by the login service 13 will be described below in detail.

Figure 4:
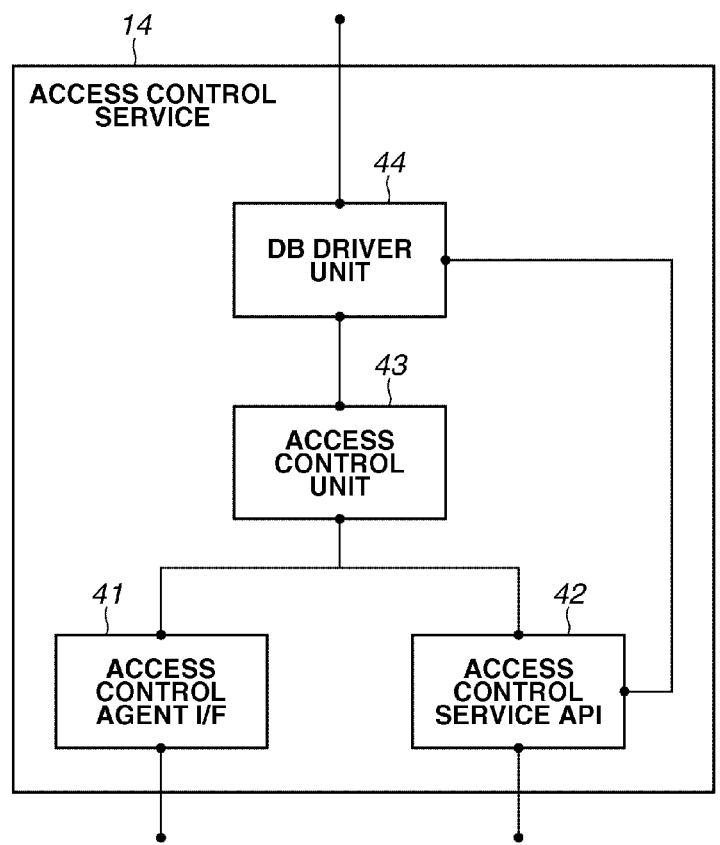
FIG. 4 is an explanatory view of software modules of an access control service.

FIG. 4 is a configuration diagram of software modules operating on the access control service 14. The respective software modules are stored in the HDD 24 illustrated in FIG. 2, and are loaded into the RAM 23 and executed by the CPU 21 as described above.

The access control agent I/F 41 performs request acceptance and response sending, from the access control agents 33 and 53 configured in the login service 13 and the service 15.

An access control service API 42 performs acceptance of API invoke from an access control service I/F 54 configured in the service 15 and sends a response indicating API execution result.

An access control unit 43 is an application module which accepts and controls access right confirmation from the access control agent I/F 41 and the access control service API 42. The access control unit 43 performs data acquisition or update of the database service 16, via a DB driver unit 44.

Thereafter, a series of access control processing executed by cooperation of the above-described software modules is described as processing executed by the access control service 14. The details of the access control processing executed by the access control service 14 will be described below.

Figure 5:
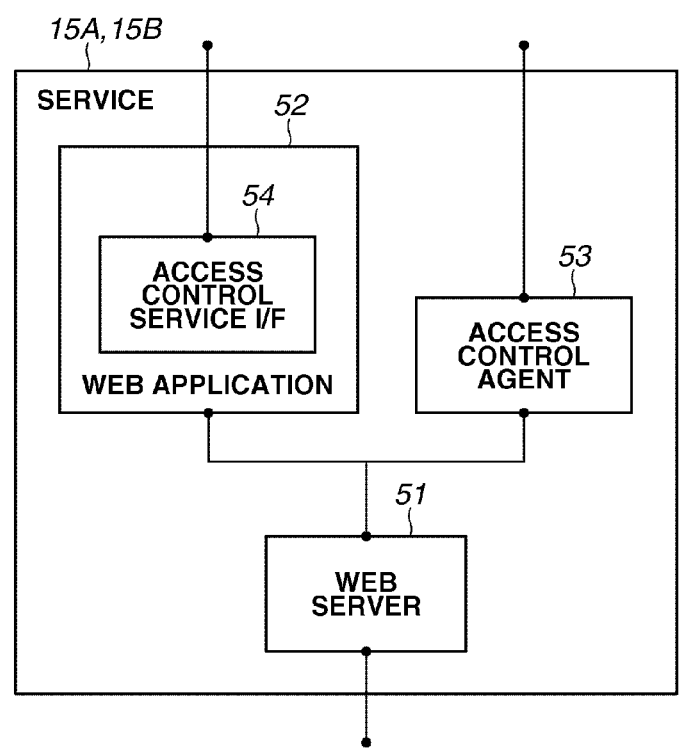
FIG. 5 is an explanatory view of software modules of services.

FIG. 5 is an example configuration of the software modules which operate on the service 15A and 15B. The respective software modules are stored in the HDD 24 illustrated in FIG. 2, and are loaded into the RAM 23 and executed by the CPU 21, as described above.

A web server 51 is a web application server provided with a web interface which accepts a web request from the client 12.

A web application 52 is configured as an application on the web server 51, and generates a screen which provides a service in response to the web request which the web server 51 has accepted.

The access control agent 53 is configured as a filtering application on the web server 51, and filters the web request to the web application 52. Then, the access control agent 53 executes authentication confirmation processing of the user and, access control processing, by communicating with the access control agent I/F 41 configured in the access control service 14.

An access control service I/F 54 is used to invoke the access control service API 42 configured in the access control service 14. The access control service I/F 54 is configured such that it can be used from the web application 52.

Thereafter, a series of web application processing executed through cooperation of the above-described software modules is described as the processing executed by the service 15. The details of the web application processing executed by the service 15 will be described below.

Figure 6:
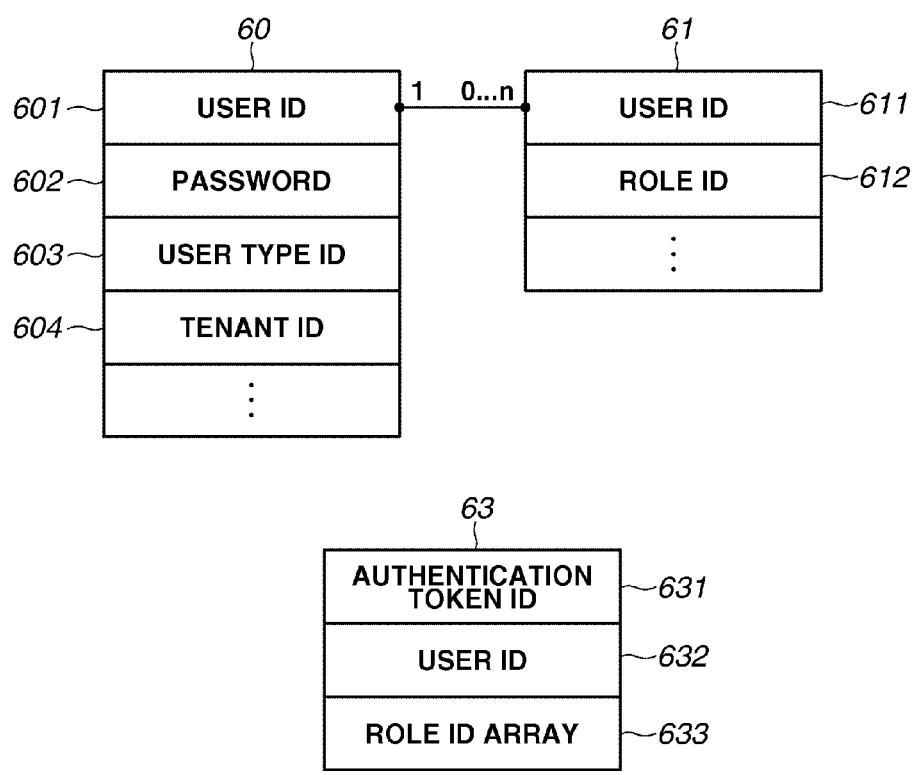
FIG. 6 illustrates an example of a data structure of user information.

FIG. 6 illustrates a data structure of user information and a data structure of authentication token information to be generated during user authentication. The user information is configured with a user table 60 and a user role table 61, and is managed by the database service 16. Further, the authentication token information is configured with an authentication token cache 63, and is stored in the RAM 23 in the access control service 14.

The user table 60 is composed of a user ID 601 for identifying a user, a password 602 which is confidential information, a user type ID 603 indicating a data access range of the user, and a tenant ID 604 for identifying a tenant to which the user belongs.

The user role table 61 is composed of a user ID 611 for identifying a user and a role ID 612 indicating role information set for the user.

The authentication token cache 63 is composed of an authentication token ID 631 for identifying an authentication token, a user ID 632 for identifying the user, and a role ID array 633 which indicates all role IDs set for the users.

The authentication processing of the user is executed in the access control service 14, and data in the authentication token cache 63 is generated when the authentication is successful.

Figure 7:
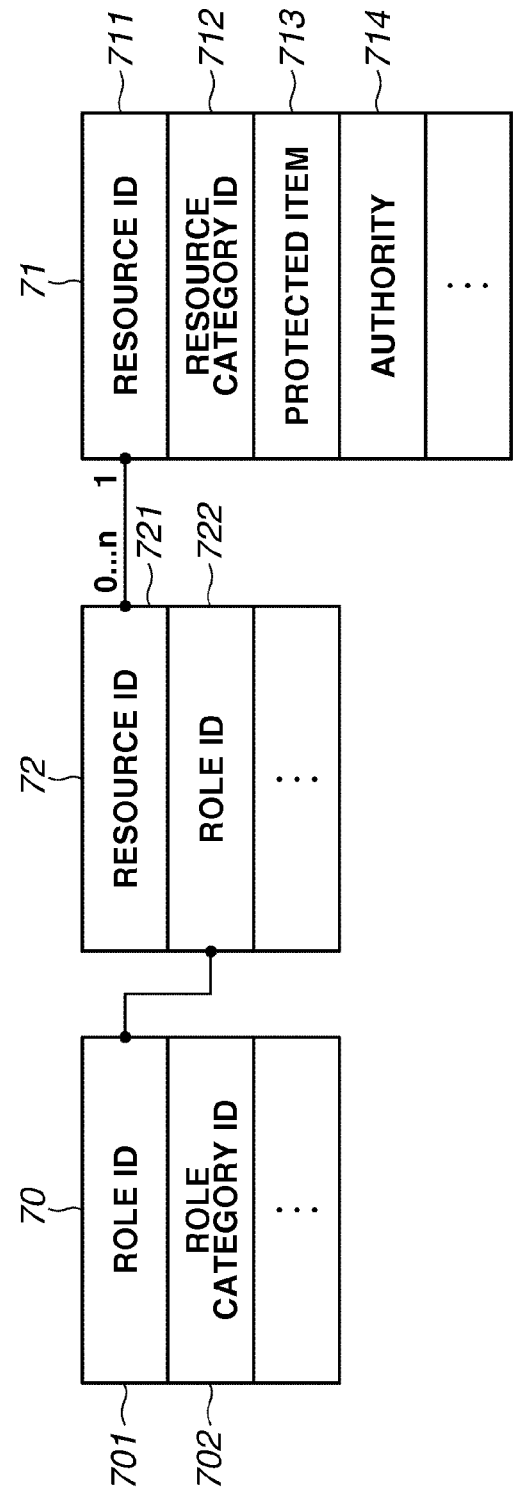
FIG. 7 illustrates an example of a data structure of resource information.

FIG. 7 illustrates a data structure of role information and resource information. The role information is configured with a role table 70 and the resource information with a resource table 71. Further, a relationship between role and resource is configured with a resource role table 72. These tables are managed by the database service 16.

The role table 70 is composed of a role ID 701 for identifying a role and a role category ID 702 for identifying a category of the role.

The resource table 71 is composed of a resource ID 711 for identifying a resource, a resource category ID 712 for identifying a category of the resource, a protected item 713 which is information managed as the resource, and an authority 714 indicating authority information for the resource.

The resource role table 72 is composed of a resource ID 721 for identifying a resource and a role ID 722 for identifying a role.

Figure 8:
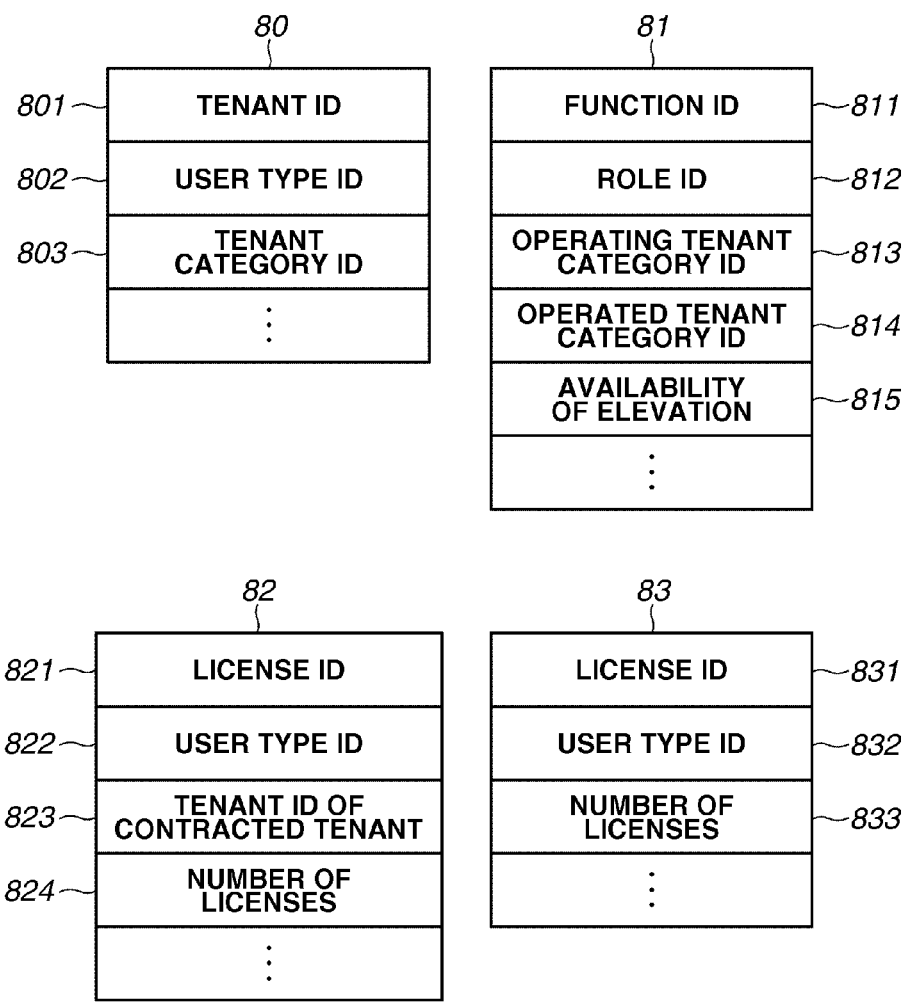
FIG. 8 illustrates an example of a data structure of application program interface (API) authority information.

FIG. 8 illustrates a data structure of tenant information and execution authority information of API (function). The tenant information is configured with a tenant table 80, the execution authority information of API (function) is configured with an API authority table 81, and they are managed in the database service 16. Further, as an example of the tenant information, a data structure of a number-of-contracted-licenses table 82 managed by a tenant that can issue licenses, and a number-of-used-licenses table 83 managed by respective tenants are also illustrated.

The tenant table 80 is composed of a tenant ID 801 for identifying a tenant, a user type ID 802 set for a user which belongs to the tenant, and a tenant category ID 803 for identifying a category of the tenant.

The API authority table 81 is composed of a function ID 811 for identifying an API, a role ID 812 for identifying a role, and an operating tenant category ID 813, an operated tenant category ID 814, and elevation availability 815. The operating tenant category ID 813 is an ID for identifying a category of the tenant to which an API executor belongs, and the operated tenant category ID 814 is an ID for identifying a category of the tenant to which data of an API execution target belongs. Further, the elevation availability 815 represents whether the API can be executed on data of a tenant different form the tenant of the API executor.

The number-of-contracted-licenses table 82 is composed of a license ID 821 for identifying a license, a user type ID 822 indicating a data access range of the user, a tenant ID 823 of a contracted tenant, and a number of licenses 824 currently under contract. The number-of-used-licenses table 83 is composed of a license ID 821 for identifying a license, a user type ID 822 indicating a data access range of the user, and a number of licenses 824 being used within the tenant.

The details of the processing of the data stored in respective data structures described in FIG. 6, FIG. 7, and FIG. 8 will be described below.

Hereinbelow, the processing flow in respective services according to the present exemplary embodiment will be described with reference to the sequences and flowcharts. The flowchart of the present exemplary embodiment is realized by causing the CPU 21 of one set of information processing apparatus (e.g., a server), or a plurality of sets of information processing apparatuses (e.g., a plurality of servers), to read and execute a related program. Further, in the present exemplary embodiment, one set of information processing apparatus (e.g., a server) may perform the processing of the present exemplary embodiment, or a plurality of sets of information processing apparatuses (e.g., a plurality of servers) may perform the processing of the present exemplary embodiment. These systems are referred to as server systems in the present exemplary embodiment.

FIG. 9 illustrates a basic sequence in a case where a web request is made from a web browser of the client 12 to the service 15. Thereafter, control in the web browser of the client 12 will be described as control of the client 12.

In sequence S9.1, the client 12 executes a web request to the web server 51 in the service 15. In sequence S9.2, the web server 51 notifies the access control agent 53, which is a filtering application of the web request.

In sequence S9.3, the access control agent 53 performs authentication confirmation to the access control unit 43, via the access control agent I/F 41 in the access control service 14. At this time, the access control agent 53 notifies the access control unit 43 of the authentication token included in the web request via the access control agent I/F 41. The access control unit 43 verifies whether the notified authentication token is stored in the authentication token cache 63. In sequence S9.3, because of a first access, the notified authentication token is not stored in the authentication token cache 63. Therefore, the access control unit 43 determines as not authenticated and sends a response indicating the access control agent 53 via the access control agent I/F 41, to shift to the login service 13.

In sequence S9.4, the access control agent 53 redirects the client 12 to the login application 32 of the login service 13. In sequence S9.5, the login application 32 generates a login screen, and presents the login screen to the client 12.

In sequence S9.6, the client 12 receives a login instruction from the user, and makes a login notification of the user information input at that time to the login application 32. In this respect, a user ID for identifying a user, and a password which is confidential information are notified as the user information.

In sequence S9.7, the login application 32, which has received the login notification, makes an authentication request to the access control unit 43 via the access control agent 33 and the access control agent I/F 41.

The access control unit 43, which has received the authentication request, verifies whether a user ID and a password included in the authentication request are valid. At this time, in sequence S9.8, the access control unit 43 compares and verifies a user ID 601 and a password 602 information stored in the user table 60 of the database service 16 via the DB driver unit 44. The password 602, which is the confidential information, is desired to be confidentialized and stored by applying, for example, an irreversible hash function. In that case, verification is performed by confidentializing, and comparing using a function which has been applied when the password information of the notified authentication request is stored in the password 602.

In sequence S9.8, the access control unit 43, when the user information is valid as a result of the verification, generates an authentication token, and stores the authentication token in the authentication token cache 63. At this time, the access control unit 43 acquires all role IDs 612 from the user role table 61, via the DB driver unit 44 using the user IDs as keys, and stores them together with the user IDs. Then, in sequence S9.9, the access control unit 43 notifies the authentication token generated by the access control agent 33 via the access control agent I/F 41.

In sequence S9.10, the access control agent 33 grants the accepted authentication token, and causes the client 12 to redirect to the web server 51 requested in sequence S9.1. Then, in sequence S9.11, the web server 51 notifies the access control agent 53 of the request similar to sequence S9.2.

In sequence S9.12, the access control agent 53 performs authentication confirmation in the access control unit 43, via the access control agent I/F 41 in the access control service 14. At this time, the access control agent 53 notifies the access control unit 43 of the authentication token included in the web request via the access control agent I/F 41. The access control unit 43 verifies whether the notified authentication token is stored in the authentication token cache 63. In sequence S9.12, the notified authentication token is stored in the authentication token cache 63. Therefore, the access control unit 43 determines that the authentication token has been authenticated, and checks for the resource access availability. The processing details of check for the resource access availability will be described below. Next, the access control unit 43, upon determining to allow the resource access, acquires user information from the user table 60 via the DB driver unit 44. Then, the access control unit 43 notifies the access control agent 53 of the acquired user information via the access control agent I/F 41.

In sequence S9.13, the access control agent 53 notifies the web application 52 of the web request and user information. The web application 52, which has received notification of the user information, generates a screen for work (not illustrated), and in sequence S9.14, presents the screen to the client 12. Then, in sequence S9.16, the client 12, upon receiving screen operation from the user, notifies the web server 51 of the web request indicating that the user has operated the screen.

Sequence S9.17, sequence S9.18 and sequence S9.19 are similar processing to those of sequence S9.11, sequence S9.12, and sequence S9.13, respectively, and thus descriptions thereof will not be repeated.

Next, a case where API of the access control service API 42 in the access control service 14 is executed along with the operation of the user in sequence S9.15 will be described.

In sequence S9.20, the web application 52 invokes an API of the access control service API 42, via the access control service I/F 54. At this time, the authentication token is notified as an argument of the API.

In sequence S9.21, the access control service API 42 performs confirmation of API execution authority. The details of the confirmation processing of the API execution authority will be described below. In a case where the API execution is allowed, the access control service API 42 requests the access control unit 43 for data acquisition according to the execution content of the API (sequence S9.22). At this time, the authentication token is notified.

In sequence S9.23, the access control unit 43 performs check processing of availability of data access. The details of the check processing of availability of data access will be described below. If the data access has been allowed, the access control unit 43 acquires data via the DB driver unit 44, and in sequence S9.24, notifies the access control service API 42 of the data.

In sequence S9.25, the access control service API 42 generates an API response based on the acquired data, and notifies the web application 52 of the API response via the access control service I/F 54.

In sequence S9.26, the web application 52 generates a screen according to the API response, and presents the screen to the client 12.

The authentication of the user and the access right control processing of the user are executed according to the basic sequences, which have been described with reference to FIG. 9, as described above.

FIG. 10A is an access control processing flow in the access control service 14 in the basic sequences, which have been described with reference to FIG. 9.

Hereinbelow, there will be described the flow in which step S1001 is executed, in the API invoke to the access control service API 42 in sequence S9.20 in FIG. 9.

The access control service API 42, upon receiving the API invoke in step S1001, confirms validity of the authentication token notified in step S1002. More specifically, the access control service API 42 checks whether the authentication token notified to the access control unit 43 is stored in the authentication token cache 63. Then, if it is determined that the authentication token is invalid (if the authentication token is not stored), in step S1003, since the authentication token is invalid, the access control service API 42 send a response indicating that the API cannot be executed. If the authentication token is valid, in step S1004, the access control service API 42 acquires the user ID using the authentication token as a key via the access control unit 43. Subsequently, the access control service API 42 acquires user information and tenant information from the user table 60 and the tenant table 80.

Next, in step S1005, the access control service API 42 acquires information using the function ID of the API invoked from the API authority table via the DB driver unit 44 as a key. In step S1006, the access control service API 42 compares the user information and tenant information acquired in step S1004 with the API authority information acquired in step S1005, and determines whether the API can be executed. This determination will be described below.

If API execution has been denied as a result of the determination in step S1006, in step S1007, the access control service API 42 denies the API execution (DENY in step S1007). In step S1008, the access control service API 42 sends a response indicating an authorization error. If the API execution has been allowed as a result of the determination (YES in step S1007), the access control service API 42 allows the API execution, and in step S1009, executes the API.

In step S1010, if the resource access is not included in an API execution content (NO in step S1010), in step S1011, the access control service API 42 generates and sends a response indicating an execution result of the API. If the resource access is included in the API execution content (YES in step S1010), in step S1012, the access control service API 42 checks for availability of the resource access to the access control unit 43. The resources include a data resource which is information stored in the database service 16, and URL resource of the web application which the service 15 provides. The processing of checking for the resource access availability in the access control unit 43 will be described below.

In step S1013, if a result of check for the resource access availability in the access control unit 43 is denied (DENY in step S1013), in step S1008, the access control service API 42 sends a response indicating authorization error. If a result of check for the resource access availability in the access control unit 43 is allowed (ALLOW in step S1013), the access control service API 42 generates and sends a response indicating an API execution result based on the acquired resource information.

Hereinbelow, the flow in which step S1021 is executed in the access authority confirmation to the access control unit 43 in sequence S9.12, sequence S9.18, and sequence S9.22 in FIG. 9 will be described with reference to FIG. 10B. Also, step S1021 is executed in the check for resource access availability in step S1012 in FIG. 10A.

Step S1021 is executed as check for resource access availability to the URL resource in sequence S9.12 and sequence S9.18, and as check for resource access availability to data resource in sequence S9.22.

In step S1021, the access control unit 43 accepts a request for check for the resource access availability. At this time, the access control unit 43 acquires an authorization token of a user which executes the resource access, a target resource category, protected item information, and an action to the protected item. The protected item information is a URL when the resource category is a URL resource, and a user type ID and acquisition condition when the resource category is a data resource. Further, the action is selected from Create, Read, Update, Delete (CRUD) to the protected item.

In step S1022, the access control unit 43 checks whether the accepted authentication token is stored in the authentication token cache 63, and verifies its validity. If the authentication token is invalid (NO in step S1022) as a result of the verification, in step S1023, the access control unit 43 notifies that the authentication token is invalid. If the authentication token is valid (YES in step S1022) as a result of the verification, in step S1024, the access control unit 43 acquires a user ID 632 and a role ID array 633.

In step S1025, the access control unit 43 identifies a resource category included in a request for check for the resource access availability. The access control unit 43 executes respective processing, if the resource category is a URL resource (URL RESOURCE in step S1025), in step S1026, and if the resource category is a data resource (DATA RESOURCE in step S1025), in step S1027.

In step S1026, and in step S1027, the access control unit 43 acquires all role IDs and authorities associated with the resources from the resource table 71 and the resource role table 72 using the resource category IDs and the protected item information as keys.

In step S1028, the access control unit 43 compares the acquired role ID and authority, with the role ID and action associated with the authentication token accepted by the request. Then, in step S1029, if the user has no access authority as a result of the comparison and verification, namely, if the access is denied (DENY in step S1029), in step S1030, the access control unit 43 notifies a denied access. If the user has an access authority as a result of the comparison and verification, namely, if an access is allowed (ALLOW in step S1029), in step S1031, the access control unit 43 acquires a target resource. For example, if the resource category is a data resource, the access control unit 43 acquires data via the DB driver unit 44 under condition of the designated acquisition range. At this time, the acquired data range is narrowed down within a range of the inevitably allowed user type ID. As a result, acquisition of the data of other tenants to which the user does not hold an access authority can be prevented.

In step S1032, the access control unit 43 notifies the acquired resource and allowed access.

Figure 10B:
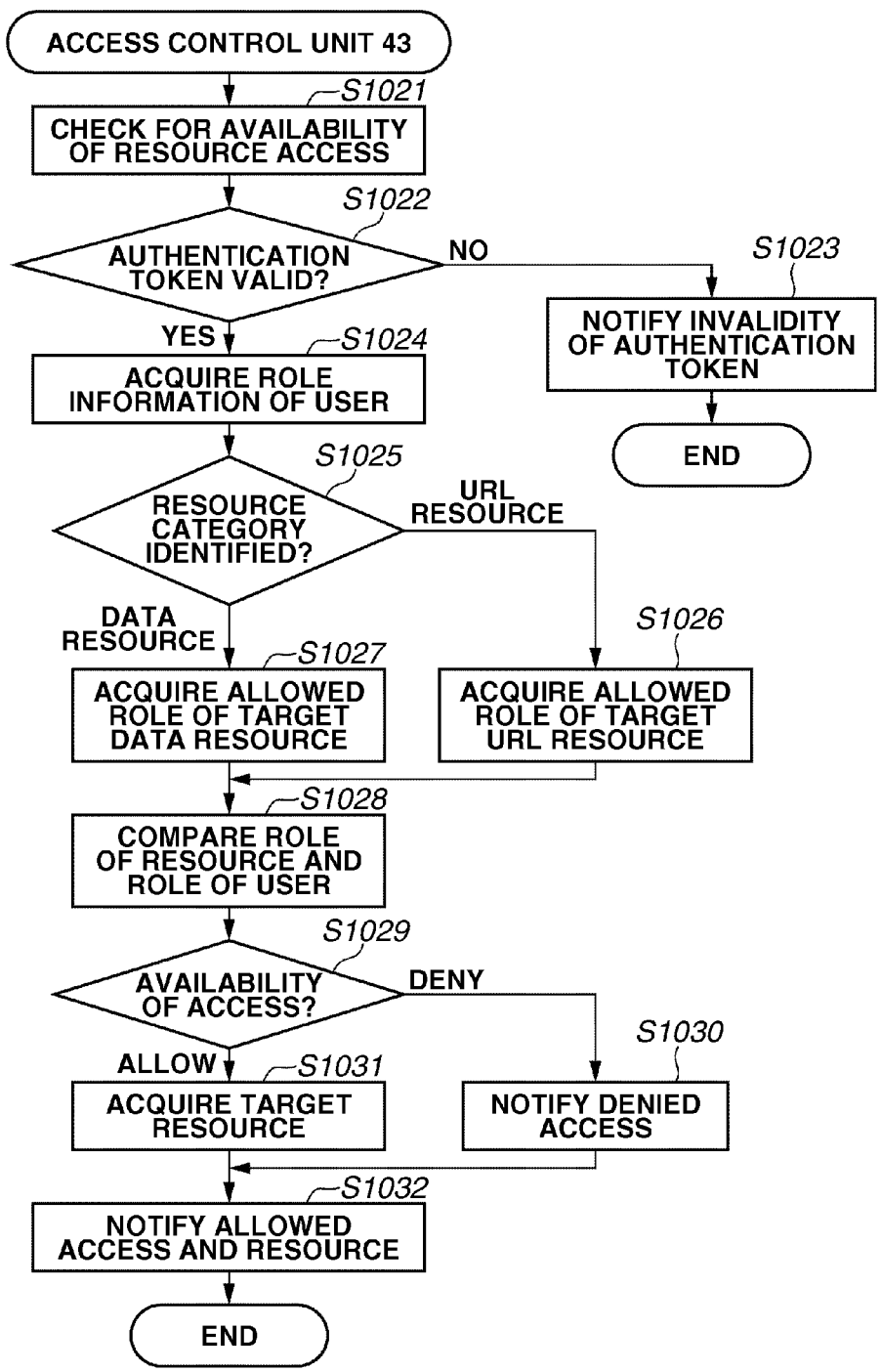
FIG. 10B is a flowchart of access availability determination to resource.

If the processing in FIG. 10B is executed in the check for resource access availability in step S1011 in FIG. 10A, step S1013 in FIG. 10A is followed by execution of the processing in FIG. 10B.

Hereinbelow, the flow for API execution determination performed in step S1006 in FIG. 10A will be described with reference to FIG. 10C.

When determination is started, in step S1006, the access control service API 42 acquires role information which allows the execution of the target API from the API authority table 81 in FIG. 8, and compares the role information with a role with which the API executor is associated.

If an executor of the API to which the authentication token has been notified is not associated with the role which allows the execution of the target API, in step S1041, the access control service API 42 determines that the executor has no execution authority (NO in step S1041), and then in step S1042, sends a response indicating denied API execution.

If the executor of the API to which the authentication token has been notified is associated with the role which allows the execution of the target API (YES in step S1041), in step S1043, the access control service API 42 compares a tenant of the executor and a tenant of the target API. This comparison corresponds to first determination processing.

If the tenants of the executor and the target API are the same (YES in step S1044), the access control service API 42 allows the execution, and in step S1045, sends a response indicating allowed execution. If the tenants of the executor and the target API are different (NO in step S1044), in step S1046, the access control service API 42 determines whether the target API is an API which is executable across tenants from a definition of the target API. More specifically, step S1046 is executed according to a content of elevation of the target API in the API authority table 81 in FIG. 8. This determination corresponds to second determination processing.

If the target API is an API which is not executable to other tenants (NO in step S1047), the access control service API 42 determines that the executor has no execution authority, and then in step S1042, sends a response indicating a denied API execution. If the target API is an API which is executable to other tenants (YES in step S1047), in step S1048, the access control service API 42 compares definition of the target API, a tenant category of the executor, and a tenant category of the target API (813 and 814 in FIG. 8). This comparison corresponds to third determination processing.

If a tenant category of the executor does not allow a tenant category of the target tenant to be processed, in the definition of the target API (NO in step S1049), the access control service API 42 determines that the executor has no execution authority, and then in step S1042, sends a response indicating a denied execution. If a tenant category of the executor allows a tenant category of processing target to be processed (YES in step S1049), in step S1050, the access control service API 42 grants processing authority for the target tenant to the executor user, and then in step S1045, sends a response indicating an allowed execution.

Figure 10C:
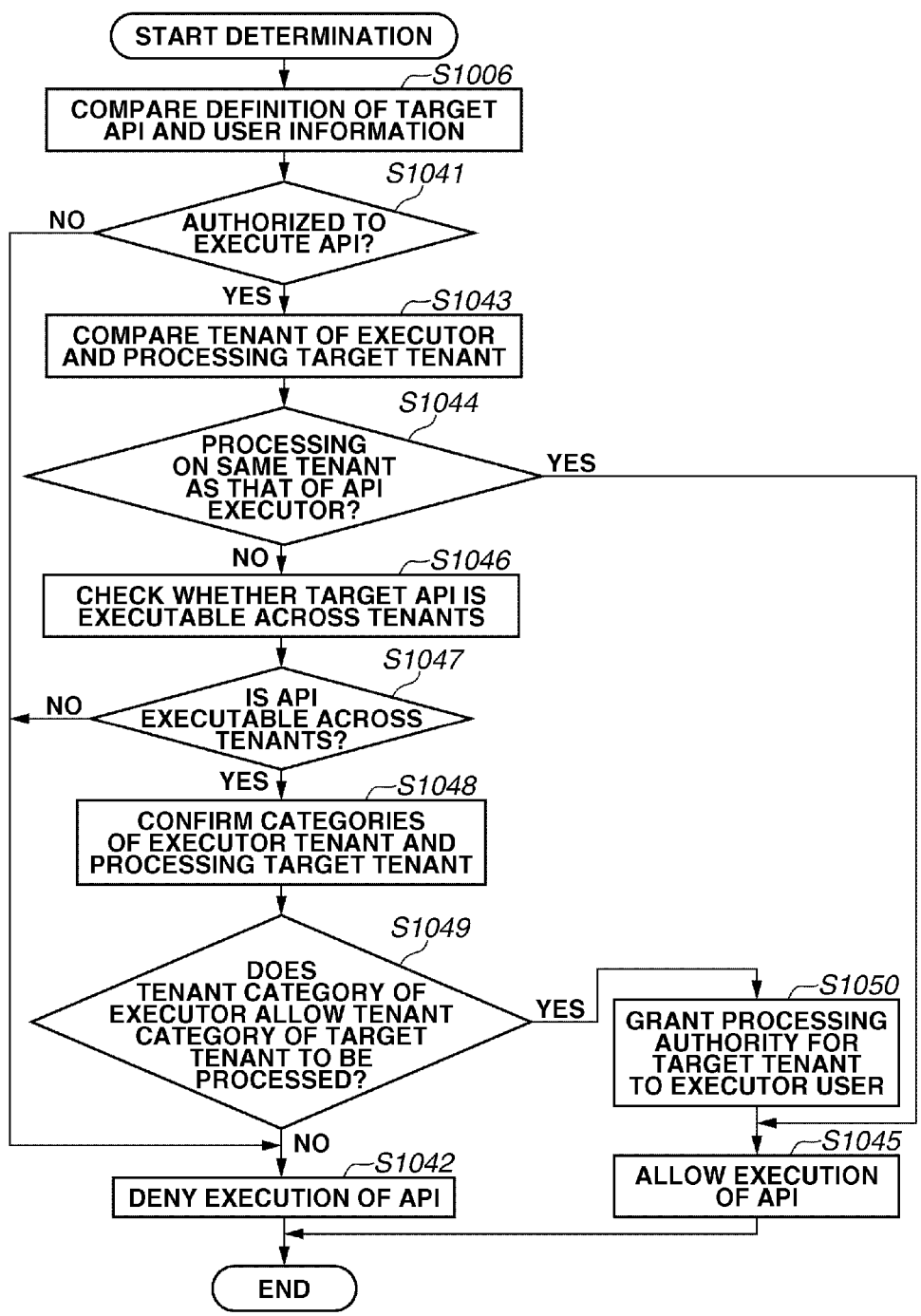
FIG. 10C is a flowchart of API execution authority determination.

As described above, the processing can be executed on data of different tenants in the multitenant system, according to the basic sequences in FIG. 9, and the access control flows in FIGS. 10A to 10C. At this time, by performing control for each API and control according to the tenant category, for the processing to other tenants, detailed control can be performed without the need to make complicated settings for the processing executor.

Next, FIG. 11, FIG. 12, and FIG. 13 are illustrated as data examples, against the tables having respective data structures described in FIG. 6, FIG. 7, and FIG. 8. Then, a service deployed in the service 15 is illustrated as FIG. 14, and an access control flow as a concrete work flow will be described with reference to FIG. 15 and FIG. 16. The data or the service described herein is an example, and thus it is not limited to a content described in the present exemplary embodiment.

Further, in order to execute processing across tenants in the present exemplary embodiment, a method for defining and using a super user which is capable of accessing data of all tenants is described. Also regarding this method, the content of the present invention is not limited thereto. For example, the processing across tenants may be realized by a method for defining a role which allows access to the data of all tenants, temporarily associating an executor with the role, or a method for temporarily associating the executor with a role which allows access to a data resource of a tenant of the processing target, or other methods.

In FIG. 11, a data example 111 of the user table 60 and a data example 112 of the user role table 61 are listed.

In FIG. 12, a definition example of a role category table 121 is listed. In the example, a management role indicating a data management authority, a product role indicating a use contract with a user, and a tenant role indicating an access range to data are defined.

In FIG. 12, a definition example of a resource category table 123 is listed. In the example, a URL resource as a target to be web-accessed and a data resource indicating the data managed by the database service 16 are defined.

In FIG. 12, a data example 122 of the role table 70, a data example 124 of the resource role table 72, and a data example 125 of the resource table 71 are listed.

In FIG. 13, a definition example of a tenant category table 131 is listed. In the example, categories of a provider tenant to which a provider who performs an operation of a service belongs, a sales tenant to which a seller who makes a use contract with a user belongs, a customer tenant which is a user, and a self who is the user itself are defined.

In FIG. 13, a data example 132 of the tenant table 80 is listed. Next, a data example 133 of the API authority table 81 is listed. In the data example, there are illustrated the following APIs: CreateTenant which creates a new tenant, GetLicenseInfo which acquires service names provided to other tenants, and a number of issued licenses, and CountLicense which counts a number of licenses used within a tenant. In the API authority table, an operating tenant category ID, an operated tenant category ID, and elevation availability are managed in correspondence with the function IDs.

In FIG. 13, a data example of a license table 134 is listed. Further, a data example 135 of the number-of-contracted-licenses table 82, and a data example 136 of the number-of-used-licenses table 83 are listed.

Figure 14:
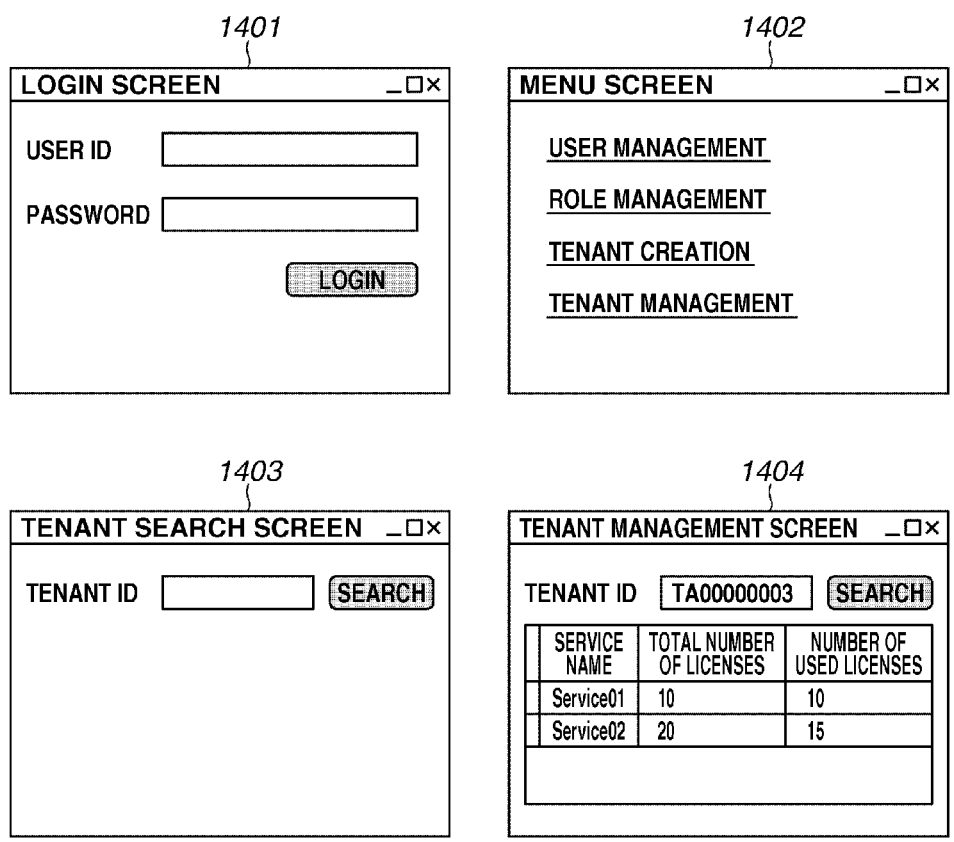
FIG. 14 illustrates a screen flow diagram of a web application by way of an example.

FIG. 14 is a screen flow example when the service 15 provides a web application (supposed to be management service) for managing a user and a role setting of the user, and tenant information, as a web application example.

A login screen 1401 is a sample screen generated by the login service 13. When the user enters a user ID and a password and then presses a login button, the login is successful and access is allowed, and then screen shift is made to a menu screen 1402. In the example, it is assumed that login operation has been operated as a user: SalesUser 01 registered on the data example 111 of the user table 60.

A menu screen 1402 is a sample screen of management services. When the user presses a tenant management link and access is allowed, then screen shift is made to a tenant search screen 1403.

The tenant search screen 1403 is a sample screen of a management service. When the user enters a search item into a tenant ID and presses a search button, execution authority of the CountLicense API is allowed, then counting of a number of licenses used by the designated tenant is executed, and screen shift is made to a search result screen 1404. In this case, it is assumed that "TA00000003" has been designated as a search item.

A tenant management screen 1404 is a sample screen of management services. In this case, the name of a service with which TA00000003 has made contracts, the number of the contracts, and the number of licenses used within the tenant are displayed.

Figure 15:
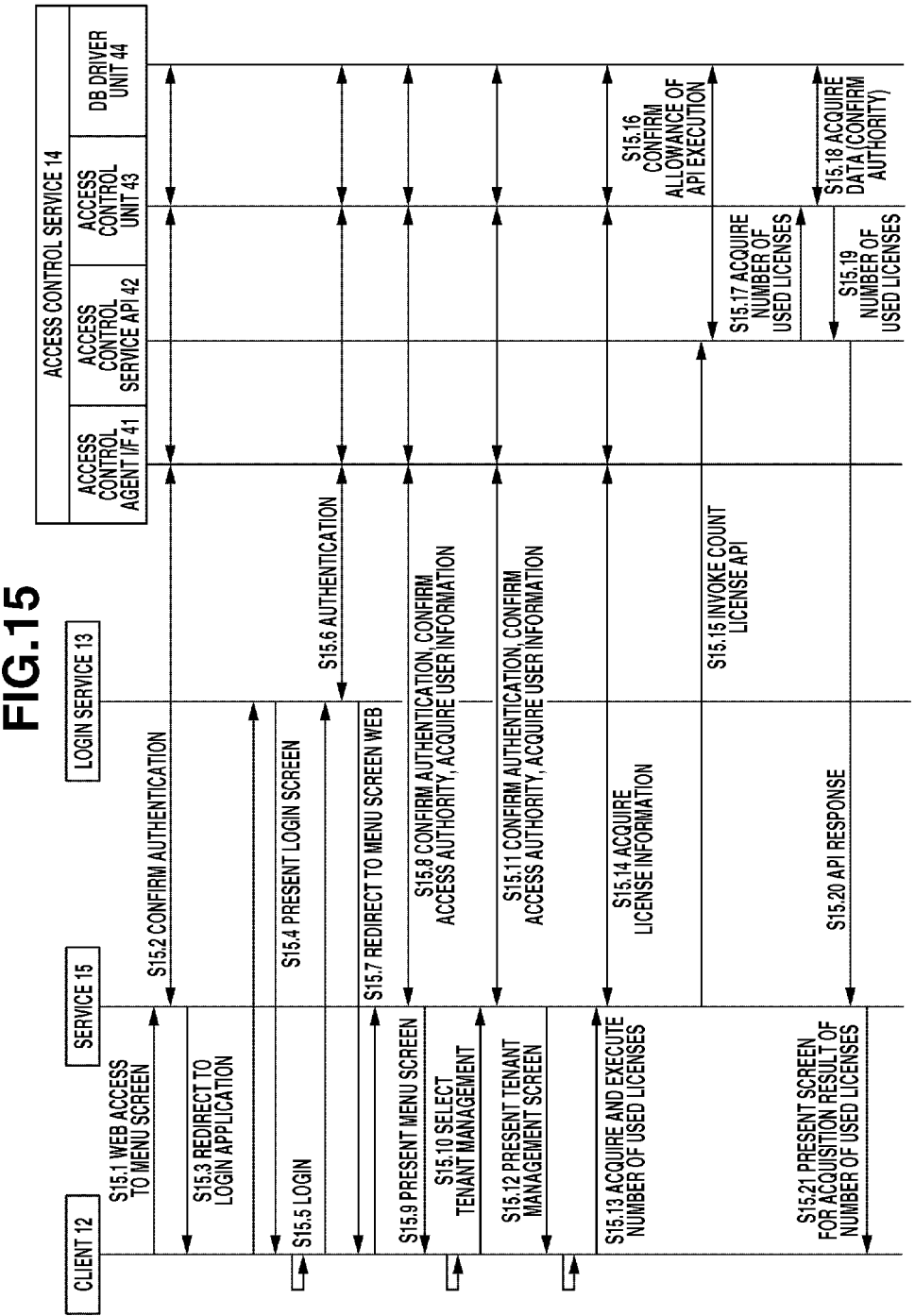
FIG. 15 illustrates access sequences of a web application by way of an example.

FIG. 15 illustrates a sequence when a user operates the screen according to the screen flow in FIG. 14.

In sequence S15.1, the client 12 makes a web request to the menu screen 1402 in the service 15. In sequence S15.2, the service 15 confirms authentication to the access control agent I/F 41. In this case, the authentication confirmation flow has been already described, in sequence S9.3 in FIG. 9, and thus descriptions thereof will not be repeated.

In sequence S15.3, the service 15 redirects the client 12 to the login service 13. Then, in sequence S15.4, the login service 13 presents the login screen 1401.

In sequence S15.5, the user performs login operation as a user ID:SalesUser01. The login service 13, which has received the login operation, requests the access control agent I/F 41 for authentication processing.

In sequence S15.6, the authentication processing has already been described in sequence S9.7 in FIG. 9, and thus descriptions thereof will not be repeated. When the authentication is successful, in the access control unit 43, an ID of the generated authentication token, a user ID:SalesUser01, and a role ID are stored in the authentication token cache 63. In this case, as the role ID, "Sales, TA00000002" of the login user is stored, based on the data example 112 of the user role table 61.

The login service 13, which has received the authentication, assigns an authentication token, and in sequence S15.7, redirects the client 12 to the menu screen 1402 in the service 15.

In sequence S15.8, the service 15 confirms authentication, confirms access authority, and acquires user information to the access control unit 43 via the access control agent I/F 41.

In the access control unit 43, it is checked whether the authentication token is stored in the authentication token cache 63. If the authentication token is stored, a user ID and a role ID array are acquired. Since the authentication token is stored this time, the user ID: SalesUser01, and the role ID array "Sales, TA00000002" are acquired.

Next, in the access control unit 43, step S1021 in FIG. 10B is executed. At this time, it is assumed that "http:xxx.com/menu/xxx.html" is passed as a target resource. This is realized by, for example, the user entering the above-described address into a browser. This resource coincides with the data stored in the resource ID:R00000001 in the data example 125 of the resource table 71. Then, the resource ID:R00000001 is allocated to a role ID:Sales in the data example 124 of the resource role table 72. The access control unit 43 checks whether the role ID:Sales is included in the role ID array acquired from the authentication token cache 63, in step S1028 in FIG. 10B. In the data example this time, since the role ID:Sales is included in the role ID array, the access control unit 43 acquires information from the data example 111 of the user table 60 as an allowed access, and notifies the service 15. In sequence S15.9, the service 15 presents the menu screen 1402 to the client 12.

Next, a sequence when the user presses the tenant management link in the menu screen 1402 will be described.

In sequence S15.10, when the tenant management is selected, then in sequence S15.11, the service 15 requests the access control unit 43 to confirm authentication, confirm access authority, and acquire user information, via the access control agent I/F 41.

In the access control unit 43, it is checked if the authentication token is stored in the authentication token cache 63. If the authentication token is stored, a user ID and a role ID array are acquired. Since the authentication token is stored this time, the user ID:SalesUser01 and the role ID array "Sales, TA00000002" are acquired.

Next, in the access control unit 43, step S1021 in FIG. 10B is executed. At this time, http:xxx.com/tenant/xxx.html" is passed as a target resource. This resource coincides with the data stored in the resource ID:R00000002 in the data example 125 of the resource table 71. Then, the resource ID:R0000002 is allocated to the role ID:Sales in the data example 124 of the resource role table 72. The access control unit 43 checks if the role ID:Sales is included in the role ID array acquired from the authentication token cache 63, in step S1028 in FIG. 10B. Since the role ID:Sales is included in the role ID array in the data example this time, the access control unit 43 acquires information from the data example 111 of the user table 60, as an allowed access, and notifies the service 15. In sequence S15.12, the service 15 presents the tenant search screen 1403 to the client 12.

Next, in the tenant search screen 1403, a sequence when the user enters the tenant ID "TA00000003" as a search item and then presses a search button will be described.

In sequence S15.13, when the tenant search is executed, then in sequence S15.14, the service 15 requests the access control unit 43 to acquire license information, via the access control agent I/F 41.

The access control unit 43 checks if an authentication token is stored in the authentication token cache 63. If the authentication token is stored, the access control unit 43 acquires a user ID and a role ID array. Since the authentication token is stored this time, the user ID: SalesUser01 and the role ID array "Sales, TA00000002" are acquired. Next, step S1021 in FIG. 10B is executed in the access control unit 43. At this time, by referring to the data example 132 of the tenant table 80 in FIG. 13, "TY00000002" is passed as a target resource. This resource coincides with the data stored in the resource ID:R00000004 in the data example 125 of the resource table 71. Then, the resource ID:R0000004 is allocated to the role ID: TA00000002 in the data example 124 of the resource role table 72. In step S1028 in FIG. 10B, the access control unit 43 checks if the role ID:TA00000002 is included in the role ID array acquired from the authentication token cache 63. Since the role ID: TA00000002 is included in the role ID array this time, the access control unit 43 determines an allowed access.

Thereafter, the access control unit 43 acquires information in which the contracted tenant ID coincides with the passed tenant ID: TA00000003, from the data example 135 of the number-of-contracted-licenses table 82, and notifies the service 15 of the information. More specifically, the license ID:TL00000001, the number of licenses: 10, the license ID:TL00000002, and the number of licenses: 20 are passed to the service 15.

In sequence S15.15, the service 15, which has received notification of the license information, executes CountLicense API with respect to the access control service API 42. At this time, the service 15 notifies a tenant ID and a license ID of a tenant targeted to acquire an authentication token and the number of licenses.

In sequence S15.16, the access control service API 42 executes step S1001 in FIG. 10A. At this time, it is assumed that the CountLicense is passed as the target API. The access control service API 42 verifies the authentication token, and acquires the user ID and the role ID array. Next, step S1005 in FIG. 10A is executed, and the function ID:CountLicense is acquired from the data example 133 of the API authority table 81.

In the access control service API 42, in step S1006, a determination of execution authority of the API is performed according to the data acquired from the data example 133 of the API authority table 81. In the data example 133 of the API authority table 81 in FIG. 13, CountLicense API allows execution to the role IDs:Provider, Sales. In this case, since the role ID: Sales is included in the role array of the executor acquired from the authentication token cache 63, then in step S1041, it is determined that the executor has execution authority.

After it has been determined that the executor has execution authority, in step S1043, the access control service API 42 confirms the executor tenant and the target tenant. According to the passed target tenant ID (TA00000003), from the data example 132 of the tenant table 80, the user type ID:TY00000003 in the data example 132 of the number-of-used-licenses table 83 becomes a data acquisition range. In this case, since this is the processing to another tenant (TA00000003) which is different from the tenant ID (TA00000002) of the executor, in step S1044, the access control service API 42 determines the processing on a different tenant.

After it has been determined to be the processing on another tenant, in step S1046, the access control service API 42 check whether the target API is allowed to execute processing across tenants. The CountLicense API which is the target API this time, gives "Allow" for elevation availability, in the data table 133 of the API authority table 81 in FIG. 13, and thus the execution across tenants is allowed. Therefore, in step S1047, it is determined that the access control service API 42 is executable across tenants.

After it has been determined that the target API is executable across tenants, in step S1048, the access control service API 42 compares a tenant category of the executor and a processing target tenant category with tenant categories which are defined in the data example 133 of the API authority table 81. To describe more specifically, in the data example 132 of the tenant table 80, "SalesTenant" is defined in the tenant TA00000002 of the executor, and "CustomerTenant" is defined in the processing target tenant TA00000003. In this case, in the data example 133 of the API authority table 81, in CountLicense API which is the target API, an operated tenant category "CustomerTenant" is defined against an operating tenant category "SalesTenant". Therefore, in step S1049, the access control service API 42 determines that the processing is allowed.

After it has been determined that the processing is allowed according to the tenant category, in step S1050, the access control API 42 logs into the system as SuperUser defined in the user table 111, and issues an authentication token. Then, SalesUser01 executes the sequences since then, and the issued authentication token of SuperUser is used herein.

In sequence S15.17, the access control service API 42, in step S1010 FIG. 10A, executes a request to the access control unit 43 for check for resource access availability as an access to the data resource. At this time, the access control service API 42 notifies the authentication token of SuperUser, and "TA00000003" for the data example 111 of the user table 60, as the data acquisition range.

In sequence S15.18, the access control unit 43 checks if the authentication token is stored in the authentication token cache 63. If the authentication token is stored, the user ID and the role ID array are acquired. Since the authentication token is stored this time, the user ID:SalesUser01 and the role ID array "SuperUser" are acquired.

Next, in the access control unit 43, step S1021 in FIG. 10B is executed. At this time, "TA00000003" is passed as the target resource. In the access control unit 43, the protected item becomes TY00000003 previously registered on the data example 111 of the user table 60. This resource data coincides with the data stored in the resource ID:R00000005 in the data example 125 of the resource table 71. Then, the resource ID:R00000005 is allocated to the role ID:TA00000003, in the data example 124 of the resource role table 72. In step S1028 in FIG. 10B, the access control unit 43 checks whether the role ID: TA00000003 is included in the acquired role ID array. In the data example this time, the role ID:TA00000003 is not included in the role ID array, but the role ID:SuperUser is included therein. Since a user type of SuperUser is "*", from the data example 111, the access control unit 43 allows an access in a range of TY00000003. Accordingly, the access control unit 43 acquires a license ID of the user type ID:TY00000003 and the number of licenses, from the data example 136 of the number-of-used-licenses table 83, and in sequence S15.19, notifies the access control service API 42. Counting of the number of used licenses can be also implemented by a method for checking whether all users within the tenant are associated with the designated licenses, and counting the number of associated users.

In sequence S15.20, the access control service API 42 sends a response indicating the number of acquired and currently used licenses as a response of CountLicense API, to the service 15.

In sequence S15.21, the service 15 generates a tenant search result screen 1404 from the acquired tenant information and presents the screen to the client 12.

The processing on data of different tenant can be executed, in the multitenant service, without the need to make complicated settings for the API executor, according to the above-described sequences in FIG. 15, and the access control flows in FIGS. 10A to 10C. Even if a provider makes a request for processing to a customer tenant in the example, ProviderTenant is not allowed to perform an operation to CustomerTenant in the data example 133. As a result, in step S1048 in FIG. 10C, the processing is denied. Further, acquisition of more information than is necessary can be prevented by setting allowance or denial of elevation on an API-to-API basis.

Next, a second embodiment of the present invention will be described.

In the first exemplary embodiment, processing to other tenants is controlled by defining availability of the processing to other tenants for each API, and at the same time defining tenant categories of an operator and an operation target. In the present exemplary embodiment, there will be described a method for controlling more finely the processing to other tenants in the first exemplary embodiment, by using information issued during tenant creation. In the present exemplary embodiment, descriptions of the portions similar to those of the first exemplary embodiment will not be repeated, and only the difference will be described.

Figure 16:
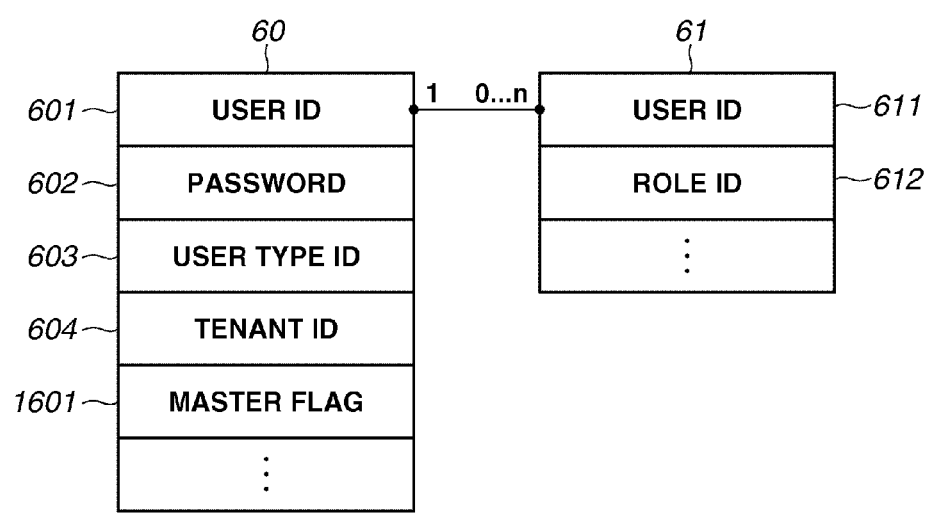
FIG. 16 illustrates an example of data of role control information.

FIG. 16 illustrates a data structure of user information in the second exemplary embodiment. The data structure in FIG. 16 is composed of a user table 60 and a user role table 61, where the data 601 to 604, 611, and 612 are similar to those in FIG. 6, and a master flag 1601 is further defined in the user table 60. The master flag 1601 is a flag representing a master user of a tenant. The master user is defined as a master administrator of the tenant, and only one person is defined to each tenant, and is supposed to be the user which will never be deleted until the tenant is deleted.

Hereinbelow, in the second exemplary embodiment, the flow during tenant creation and authority determination during API execution will be described with reference to FIGS. 17, 18, and 19.

Figure 17:
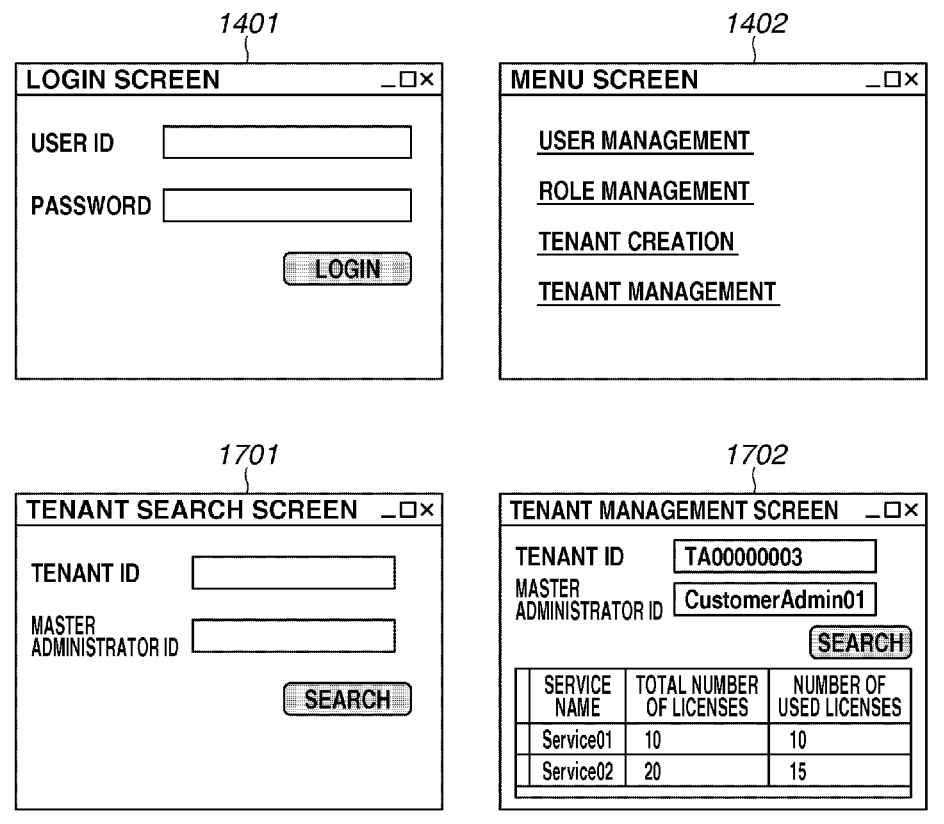

FIG. 17 illustrates a screen flow example when the service 15, in the second exemplary embodiment, has serviced a web application (taken as management service) for managing a user or role settings of the user and the tenant information, as a web application example.

The screens 1401 and 1402 are similar to those of the above-described flow in FIG. 14.

A tenant search screen 1701 is an example screen of management service. When the user enters search items into a tenant ID and a master administrator ID and then presses a search button, an execution authority of CountLicense API is confirmed, similar to the first exemplary embodiment. When the execution authority of CountLicense API is allowed, counting of the number of licenses being used in the designated tenant is executed, and the screen shifts to a tenant management screen 1702.

The tenant management screen 1702 is an example screen of management service. In this case, the services which TA00000003 has contracted, the number of contracts, and the number of licenses being used within the tenant are displayed.

Figure 18:
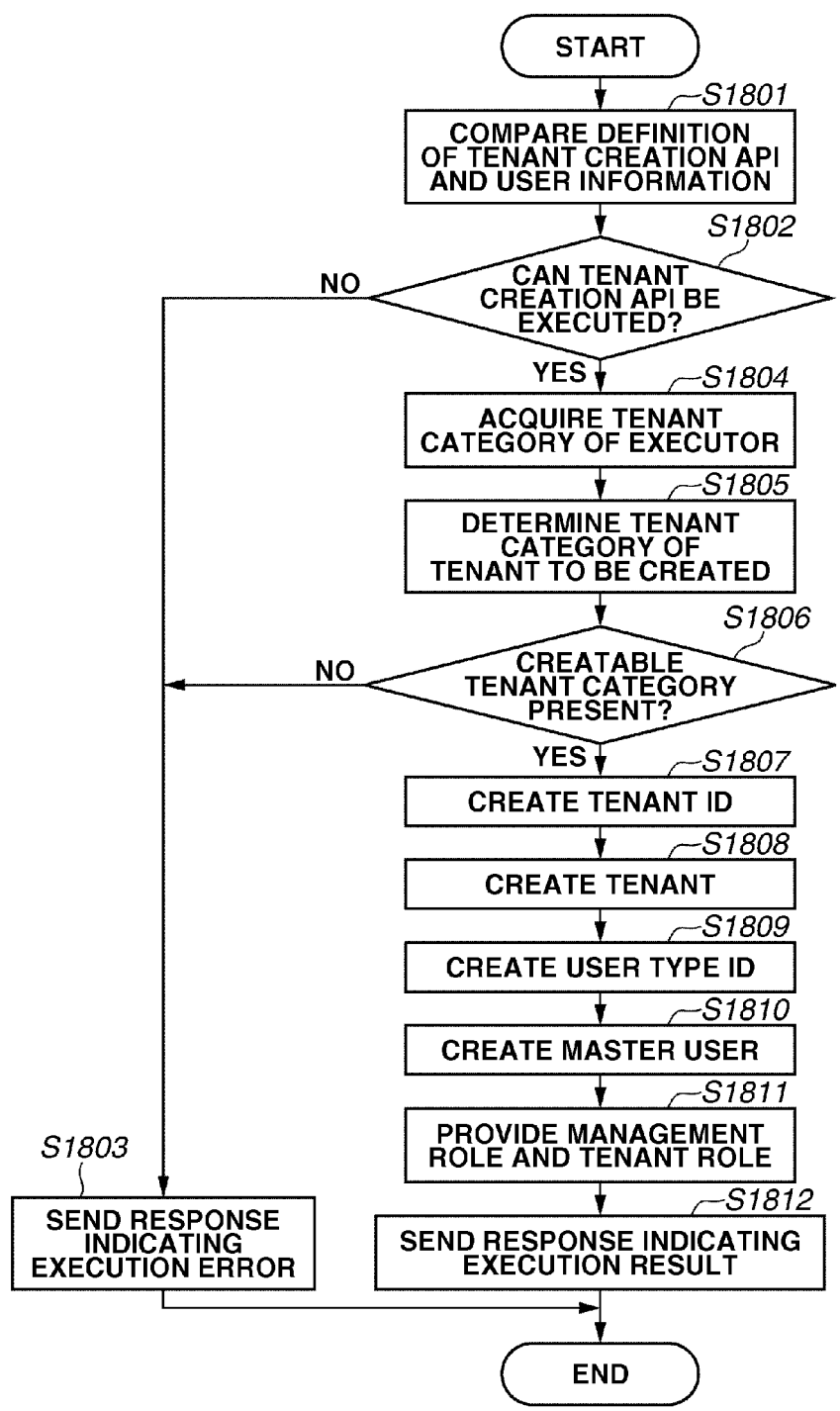
FIG. 18 is a flowchart of API execution authority determination using a master administrator.

FIG. 18 illustrates a processing flow when the tenant creation API has been executed in step S1005 in FIG. 10A. In this regard, descriptions will be made taking a case where SalesUser01 defined in data example 111 of the user table 60 creates a tenant for an example.

If an API which becomes a target in step S1005 is a tenant creation API, in step S1801, the access control service API 142 confirms a role ID which an executor has, and performs API execution allowance determination. Since SalesUser01 has the role ID:Sales, an execution of CreateTenant API is allowed.

If an execution of API is not allowed in step S1801, then in step S1802, the execution is denied (NO in step S1802), and then in step S1803, the access control service API 142 sends a response indicating an execution error. If the API execution is allowed, in step S1804, the access control service API 142 acquires a tenant category of the API executor. SalesUser01 is a user of the tenant ID:TA0000001, and it is determined as the tenant category ID:SalesTenant from the tenant table 132.

Thereafter in step S1805, the access control service API 142 confirms an operating tenant category ID and an operated tenant category ID of CreateTenant API defined in the data example 133 of the API authority table 81. Then, the access control service API 142 determines a tenant category to be created. In the data example 133 of the API authority table 81, since a user of the tenant category:SalesTenant is defined as being able to create CustomerTenant, the tenant category to be created is determined as CustomerTenant.

If creatable tenant is not present as a result of tenant category determination of the tenant to be created, in step S1806, it is determined as not creatable (NO in step S1806), then in step S1803, the access control service API 142 sends a response indicating an execution error. If a creatable tenant is present, in step S1806, it is determined as creatable (YES in step S1806), in step S1807, the access control service API 142 creates a tenant ID. This time, "TA00000004" is assumed to have been created as a new tenant ID.

When the tenant ID is created, in step S1808, the access control service API 142 creates a tenant according to the created tenant ID, and then in step S1809, creates a user type ID. This time, "TY00000004" is assumed to have been created as the user type ID. Thus, the access control service API 142 registers the created tenant ID:TA00000004, the user type ID:TY00000004, and the tenant category ID:CustomerTenant, on the tenant table 132.

When the tenant is created and is then registered in the tenant table, in step S1810, the access control service API 142 creates a master user of the tenant which becomes a master administrator of the tenant. This time, "CustomerAdmin02" is assumed to have been created as the master user. The access control service API 142 registers the thus created master user ID: CustomerAdmin, the password, the user type ID:TY00000004, and the tenant ID: TA00000004 in the data example 111 of the user table 60.

Thereafter, in step S1811, the access control service API 142 grants a management role and a tenant role for using a cloud service for the created master user. This time, "CustomerAdmin,Customer" is assigned as the management role, and "TA00000004" is assigned as the tenant the role to CustomerAdmin02.

When the role is granted to the master user, in step S1812, the access control service API 142 sends a response indicating a processing result, and ends the processing.

According to the above flows, a master administrator of the tenant is created during tenant creation.

Figure 19:
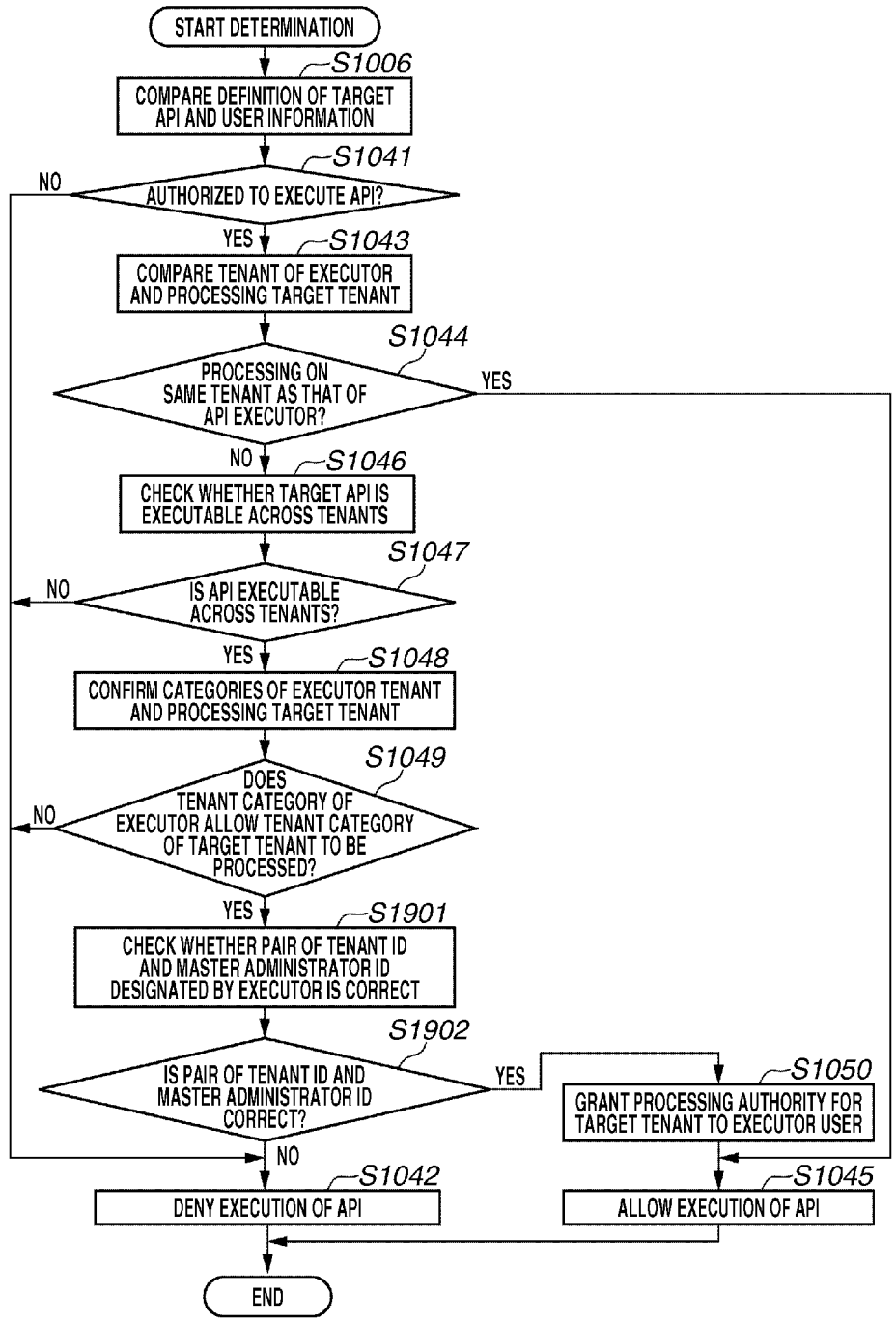
FIG. 19 is a flowchart of authority determination during API execution.

FIG. 19 illustrates an authority determination flow during API execution in the second exemplary embodiment.

Step S1006 and step S1041 to step S1049 in FIG. 19 are similar to those in FIG. 10C.

In the second exemplary embodiment, when processing is performed on data of another tenant, a master administrator ID of the tenant in addition to a tenant ID of the tenant which becomes a target are requested.

After it is determined in step S1049 that the tenant category of the executor is executable across tenants, in step S1901, the access control service API 142 checks whether a master administrator ID designated by the executor corresponds to a master administrator of the tenant which becomes a target. In other words, it is determined whether the master administrator ID designated by the executor is identical to a setting content of a master administrator ID set for a new tenant.

If the master administrator ID is not correct (NO in step S1902), then in step S1902, the access control service API 142 denies an access to data of the other tenant, and then in step S1042, denies execution. If the master administrator ID is correct (YES in step S1902), then in step S1902, the access control service API 142 allows processing, and then in step S1050, grants a processing authority for the target tenant.

Accordingly, a user which can access data of another tenant can be limited to a user which knows a master administrator ID of that tenant.

In the present exemplary embodiment, since a master tenant ID is created during contract, others except for a tenant creator are prevented from accessing the tenant across tenants. Accordingly, for example, in a case where a plurality of sellers is present, they are prevented from unnecessarily accessing data of a customer tenant. Further, in a case where a seller has concluded a contract with a customer which has already used the service and has a tenant, a newly contracted seller becomes able to access data of the customer tenant, by being notified of a master administrator ID from the customer.

According to an exemplary embodiment of the present invention, in a multitenant service, an executor can perform processing to a tenant different from a tenant to which the executor belongs. Further, when processing across tenants is performed, a more operation than is necessary or acquisition of more information than is necessary can be prevented.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-144654 filed Jun. 29, 2011, which is hereby incorporated by reference herein in its entirety.

What is claimed is:

1. A server system that provides a multitenant service, the server system comprising:
   a first determination unit configured to determine whether a role allocated to a first tenant to which an executor that has instructed an execution of a function belongs and a role allocated to a second tenant that is a target of processing by the function are associated with each other;
   an allowance unit configured to, if it is determined by the first determination unit that the role allocated to the first tenant and the role allocated to the second tenant are associated with each other, allow the executor to execute the function;
   a second determination unit configured to, if it is determined by the first determination unit that the role allocated to the first tenant and the role allocated to the second tenant are not identical, determine whether the function is processable; and
   a third determination unit configured to, if it is determined by the second determination unit that the function is processable even if the role allocated to the first tenant and the role allocated to the second tenant are not identical, determine whether a relationship between the first tenant and the second tenant is a relationship that allows an execution of the function,
   wherein, if it is determined by the third determination unit that a relationship between the first tenant and the second tenant is a relationship that allows an execution of the function, the allowance unit allows the executor to execute the function with respect to the second tenant.

2. The server system according to claim 1, further comprising:
   a setting unit configured to, during creation of a new tenant, set a master administrator for the new tenant; and
   a checking unit configured to, based on a setting content of the setting unit, check whether it is determined by the third determination unit that a relationship between the first tenant and the second tenant is a relationship that allows an execution of the function, and whether a combination of a tenant ID and a master administrator ID of the new tenant designated by the executor is correct,
   wherein, if it is determined by the third determination unit that a relationship between the first tenant and the second tenant is a relationship that allows an execution of the function and it is determined by the checking unit that the combination is correct, the allowance unit allows the executor to execute the function.

3. The server system according to claim 1, further comprising:
   a storage unit configured to store authority information in which, regarding the function, the first tenant, the second tenant, and information indicating whether to allow processing of the function even if the first tenant and the second tenant are not identical are associated with one another,
   wherein the third determination unit determines, based on the authority information, whether a relationship between the first tenant and the second tenant is a relationship that allows an execution of the function.

4. A control method executable in a server system that provides a multitenant service, the control method comprising:
   determining, by a first determination unit, whether a role allocated to a first tenant to which an executor that has instructed an execution of a function belongs and a role allocated to a second tenant that is a target of processing by the function are associated with each other;
   allowing, by an allowance unit configured to, if it is determined by the first determination unit that the role allocated to the first tenant and the role allocated to the second tenant are associated with each other, the executor to execute the function;
   determining, by a second determination unit configured to, if it is determined by the first determination unit that the role allocated to the first tenant and the role allocated to the second tenant are not identical, whether the function is processable; and
   determining, by a third determination unit configured to, if it is determined by the second determination unit that the function is processable even if the role allocated to the first tenant and the role allocated to the second tenant are not identical, whether a relationship between the first tenant and the second tenant is a relationship that allows an execution of the function, wherein, if it is determined by the third determination unit that a relationship between the first tenant and the second tenant is a relationship that allows an execution of the function, the allowance unit allows the executor to execute the function with respect to the second tenant.

5. The control method according to claim 4, further comprising:

setting, during creation of a new tenant, a master administrator for the new tenant;

checking, based on a setting content of the master administrator, whether it is determined that a relationship between the first tenant and the second tenant is a relationship that allows an execution of the function, and whether a combination of a tenant ID and a master administrator ID of the new tenant designated by the executor is correct; and allowing, if it is determined that a relationship between the first tenant and the second tenant is a relationship that allows an execution of the function and it is determined that the combination is correct, the executor to execute the function.

6. The control method according to claim 4, further comprising:

storing authority information in which, regarding the function, the first tenant, the second tenant, and information indicating whether to allow processing of the function even if the first tenant and the second tenant are not identical are associated with one another; and determining, based on the authority information, whether a relationship between the first tenant and the second tenant is a relationship that allows an execution of the function.

7. A computer-readable storage medium storing a program executable in a server system that provides a multitenant service, the program comprising:

determining, by a first determination unit, whether a role allocated to a first tenant to which an executor that has instructed an execution of a function belongs and a role allocated to a second tenant that is a target of processing by the function are associated with each other;

allowing, by an allowance unit configured to, if it is determined by the first determination unit that the role allocated to the first tenant and the role allocated to the second tenant are associated with each other, the executor to execute the function;

determining, by a second determination unit configured to, if it is determined by the first determination unit that the role allocated to the first tenant and the role allocated to the second tenant are not identical, whether the function is processable; and determining, by a third determination unit configured to, if it is determined by the second determination unit that the function is processable even if the role allocated to the first tenant and the role allocated to the second tenant are not identical, whether a relationship between the first tenant and the second tenant is a relationship that allows an execution of the function, wherein, if it is determined by the third determination unit that a relationship between the first tenant and the second tenant is a relationship that allows an execution of the function, the allowance unit allows the executor to execute the function with respect to the second tenant.

8. The computer-readable storage medium according to claim 7, the program further comprising:

setting, during creation of a new tenant, a master administrator for the new tenant;

checking, based on a setting content of the master administrator, whether it is determined that a relationship between the first tenant and the second tenant is a relationship that allows an execution of the function, and whether a combination of a tenant ID and a master administrator ID of the new tenant designated by the executor is correct; and allowing, if it is determined that a relationship between the first tenant and the second tenant is a relationship that allows an execution of the function and it is determined that the combination is correct, the executor to execute the function.

9. The computer-readable storage medium according to claim 7, the program further comprising:

storing authority information in which, regarding the function, the first tenant, the second tenant, and information indicating whether to allow processing of the function even if the first tenant and the second tenant are not identical are associated with one another; and determining, based on the authority information, whether a relationship between the first tenant and the second tenant is a relationship that allows an execution of the function.

10. A system including a client and a server system that provides a multitenant service, the system comprising:

a transmission unit configured to transmit an execution request, being issued by the client, of a function which is executed by an executer;

a first determination unit configured to determine whether a role allocated to a first tenant to which the executor that has instructed an execution of the function belongs and a role allocated to a second tenant that is a target of processing by the function are associated with each other, in response to reception of the execution request;

an allowance unit configured to, if it is determined by the first determination unit that the role allocated to the first tenant and the role allocated to the second tenant are associated with each other, allow the executor to execute the function;

a second determination unit configured to, if it is determined by the first determination unit that the role allocated to the first tenant and the role allocated to the second tenant are not identical, determine whether the function is processable; and a third determination unit configured to, if it is determined by the second determination unit that the function is processable even if the role allocated to the first tenant and the role allocated to the second tenant are not identical, determine whether a relationship between the first tenant and the second tenant is a relationship that allows an execution of the function, wherein, if it is determined by the third determination unit that a relationship between the first tenant and the second tenant is a relationship that allows an execution of the function, the allowance unit allows the executor to execute the function with respect to the second tenant.

* * * * *